United States Patent
Ni et al.

(10) Patent No.: US 12,010,510 B2
(45) Date of Patent: Jun. 11, 2024

(54) SYSTEMS AND METHODS FOR SECURE VIRTUALIZED BASE STATION ORCHESTRATION

(71) Applicant: CommScope Technologies LLC, Hickory, NC (US)

(72) Inventors: James J Ni, Medford, MA (US); Shanthakumar Ramakrishnan, Westford, MA (US); Tat Keung Chan, San Diego, CA (US); Alexander Medvinsky, San Diego, CA (US); Prashanth Venkatesh, Bangalore (IN); Devaraj Sambandan, Bengaluru (IN)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 17/856,164

(22) Filed: Jul. 1, 2022

(65) Prior Publication Data

US 2023/0007474 A1 Jan. 5, 2023

(30) Foreign Application Priority Data

Jul. 2, 2021 (IN) .............................. 202141029723

(51) Int. Cl.
*H04W 12/0431* (2021.01)
*H04L 9/40* (2022.01)
*H04W 12/069* (2021.01)

(52) U.S. Cl.
CPC ..... *H04W 12/0431* (2021.01); *H04L 63/0272* (2013.01); *H04W 12/069* (2021.01)

(58) Field of Classification Search
CPC ........... H04W 12/0431; H04W 12/069; H04W 12/03; H04W 12/108; H04L 63/0272;
(Continued)

(56) References Cited

U.S. PATENT DOCUMENTS 6,449,722 B1 * 9/2002 West ...................... H04L 45/22
726/4
10,205,719 B2 2/2019 Feng et al.
(Continued)

FOREIGN PATENT DOCUMENTS

CN 109691009 A * 4/2019 ........... H04L 9/0827
CN 108809907 B 5/2021
(Continued)

OTHER PUBLICATIONS

International Searching Authority, "International Search Report and Written Opinion from PCT Application No. PCT/US2022/035975", from Foreign Counterpart to U.S. Appl. No. 17/856,164, filed Oct. 21, 2022, pp. 1 through 8, Published in: KR.

*Primary Examiner* — John B King
(74) *Attorney, Agent, or Firm* — Fogg & Powers LLC

(57) ABSTRACT

In one embodiment, a method for secure virtualized wireless base station orchestration comprises: obtaining a node certificate and private key from a global CA defining a PKI signing certificate/private key; obtaining a sub CA certificate/private key from either an edge cloud node cluster or the global CA, using a PKI request signed using the PKI signing certificate/private key; establishing an orchestration access IPsec tunnel to a cloud comprising edge cloud orchestration functions; utilizing the orchestration functions to deploy on the node virtualized entities comprising VNFs of a wireless base station; obtaining at least one VNF certificate and private key for the VNFs from the global CA using a PKI request signed using the global certificate/private key; utilizing the VNF certificate/private key, establishing IPsec tunnels between the VNFs and a wireless network services operator network and/or to an OAM secure gateway for a DMS.

20 Claims, 26 Drawing Sheets

(58) Field of Classification Search
CPC ............... H04L 2209/80; H04L 9/3263; H04L 63/0807; H04L 63/029
See application file for complete search history.

(56) References Cited

U.S. PATENT DOCUMENTS

| | | | | |
|---|---|---|---|---|
| 2005/0068938 | A1* | 3/2005 | Wang | H04M 7/1235 |
| | | | | 370/352 |
| 2008/0020801 | A1* | 1/2008 | Fesas | H04W 28/0808 |
| | | | | 455/561 |
| 2015/0282222 | A1* | 10/2015 | Yan | H04L 63/20 |
| | | | | 370/329 |
| 2016/0094573 | A1* | 3/2016 | Sood | H04L 63/1408 |
| | | | | 726/1 |
| 2017/0006648 | A1* | 1/2017 | Aronius | H04L 63/164 |
| 2018/0041905 | A1* | 2/2018 | Ashrafi | H04W 16/10 |
| 2019/0342187 | A1 | 11/2019 | Zavesky et al. | |
| 2019/0342266 | A1* | 11/2019 | Ramachandran | H04L 63/0272 |
| 2020/0028700 | A1* | 1/2020 | Zaks | H04W 12/0471 |
| 2020/0186427 | A1* | 6/2020 | Chunduru Venkata | H04L 9/0877 |
| 2021/0014113 | A1 | 1/2021 | Guim Bernat et al. | |
| 2021/0021609 | A1* | 1/2021 | Smith | G06F 8/60 |
| 2021/0132980 | A1 | 5/2021 | Thakkar et al. | |
| 2021/0185013 | A1* | 6/2021 | Zhang | H04L 61/5014 |
| 2021/0314171 | A1* | 10/2021 | Choyi | H04L 9/3247 |
| 2021/0377053 | A1* | 12/2021 | Mahajan | H04L 63/0281 |
| 2021/0377054 | A1* | 12/2021 | Mahajan | G06F 9/455 |

FOREIGN PATENT DOCUMENTS

| | | | | |
|---|---|---|---|---|
| WO | WO-2015143651 | A1 * | 10/2015 | ............... G06F 8/63 |
| WO | WO-2017066931 | A1 * | 4/2017 | ......... G06F 9/45558 |
| WO | WO-2023278851 | A1 * | 1/2023 | ......... H04L 63/0272 |

* cited by examiner

SYSTEMS AND METHODS FOR SECURE VIRTUALIZED BASE STATION ORCHESTRATION

CROSS-REFERENCE TO RELATED APPLICATION

This application claims priority to Indian Provisional Application No. 202141029723, filed on Jul. 2, 2021, and titled "SYSTEMS AND METHODS FOR SECURE VIRTUALIZED BASE STATION ORCHESTRATION," the contents of which are incorporated herein by reference in their entirety.

BACKGROUND

Cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as addressing other issues in the network.

In general, a distributed 5G gNodeB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud"). A distributed 5G gNodeB can be partitioned into one or more central units (CUs), one or more distributed units (DUs), and one or more radio units (RUs). Each CU can be further partitioned into a central unit control-plane (CU-CP) and one or more central unit user-plane (CU-UPs) dealing with the gNodeB Packet Data Convergence Protocol (PDCP) and above layers of functions of the respective planes, and each DU configured to implement the upper part of physical layer through radio link control layer of both control-plane and user-plane of gNodeB. In this example, each RU is configured to implement the radio frequency (RF) interface and lower physical layer control-plane and user-plane functions of the gNodeB. Each RU is typically implemented as a physical network function (PNF) and is deployed in a physical location where radio coverage is to be provided. Each DU is typically implemented as a virtual network function (VNF) and, as the name implies, is typically distributed and deployed in a distributed manner in the operator's edge cloud. Each CU-CP and CU-UP are typically implemented as virtual network functions (VNFs) and, as the name implies, are typically centralized and deployed in the operator's central cloud.

Orchestrating gNodeB virtualized network functions (VNFs) and configure them into service ready network elements involves mainly three major stages: 1) virtualization infrastructure orchestration/management (referred as VIM in relevant industry standards) stage in which bare metal hardware elements are orchestrated by the infrastructure orchestration framework to build up the virtualization environment for the next stage of service orchestration; 2) virtual network functions (VNFs) service orchestration/management (referred as VNFM in relevant industry standards) stage in which gNodeB VNFs are orchestrated over the virtualization environment established in previous stage; 3) virtual network functions (VNFs) service configuration and activation stage in which the operator of gNodeBs configures and activates them via OAM to bring them into services. In all these three stages, when the orchestrating and managing functions are not in the same trusted network environments as where the gNodeB VNFs are to be deployed, appropriate security procedures such as Internet Protocol Security (IPsec) tunnels, secure shell protocol (SSH) access, Transport Layer Security (TLS)/Hypertext Transfer Protocol Secure (HTTPS) and so on are used to secure the relevant elements. To satisfy all these security requirements, interactions with certificate authority (CA) to acquire security certificates and keys are necessary.

SUMMARY

The Embodiments of the present disclosure provide methods and systems for secure virtualized base station orchestration and will be understood by reading and studying the following specification.

A method for secure virtualized wireless base station orchestration on a node of a scalable cloud environment, the method comprising: obtaining a node certificate and private key from a global certificate authority (CA) using a PKI request signed using a global certification and key, wherein the node certificate and private key defines a PKI signing certificate and private key; obtaining an edge cloud node cluster sub CA certificate and private key from either an edge cloud node cluster or from the global CA, using a PKI request signed using the PKI signing certificate and private key; establishing an orchestration access IPsec tunnel to an orchestration central cloud comprising one or more functions for edge cloud orchestration; utilizing, via the orchestration access IPsec tunnel, the one or more functions for edge cloud orchestration to deploy on the node one or more virtualized entities comprising one or more virtual network functions of a wireless base station; obtaining at least one virtual network function (VNF) certificate and private key for the one or more deployed VNFs from the global CA using a PKI request signed using the global certificate and private key; utilizing the at least one VNF certificate and private key, establishing one or more IPsec tunnels comprising at least one of: at least one X2 IPsec tunnel between the one or more virtual network functions of the wireless base station and a wireless network services operator network; at least one S1/X2 IPsec tunnel between the one or more virtual network functions of the wireless base station and a wireless network services operator network; and at least one O1 IPsec tunnel to an Operations and Maintenance (OAM) secure gateway for a wireless base station Device Management System (DMS).

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

The systems and methods described herein provide for secure interactions with certificate authorities (CAs) to acquire security certificates and keys for orchestrating a virtualized wireless base station onto one or more VNF hosting platforms. These disclosed embodiments include both a centralized authorization token-based solution and a distributed signing key-based solution, with processes for obtaining renewed sets of certificates and keys for both centralized and distributed solutions.

Figure 1:
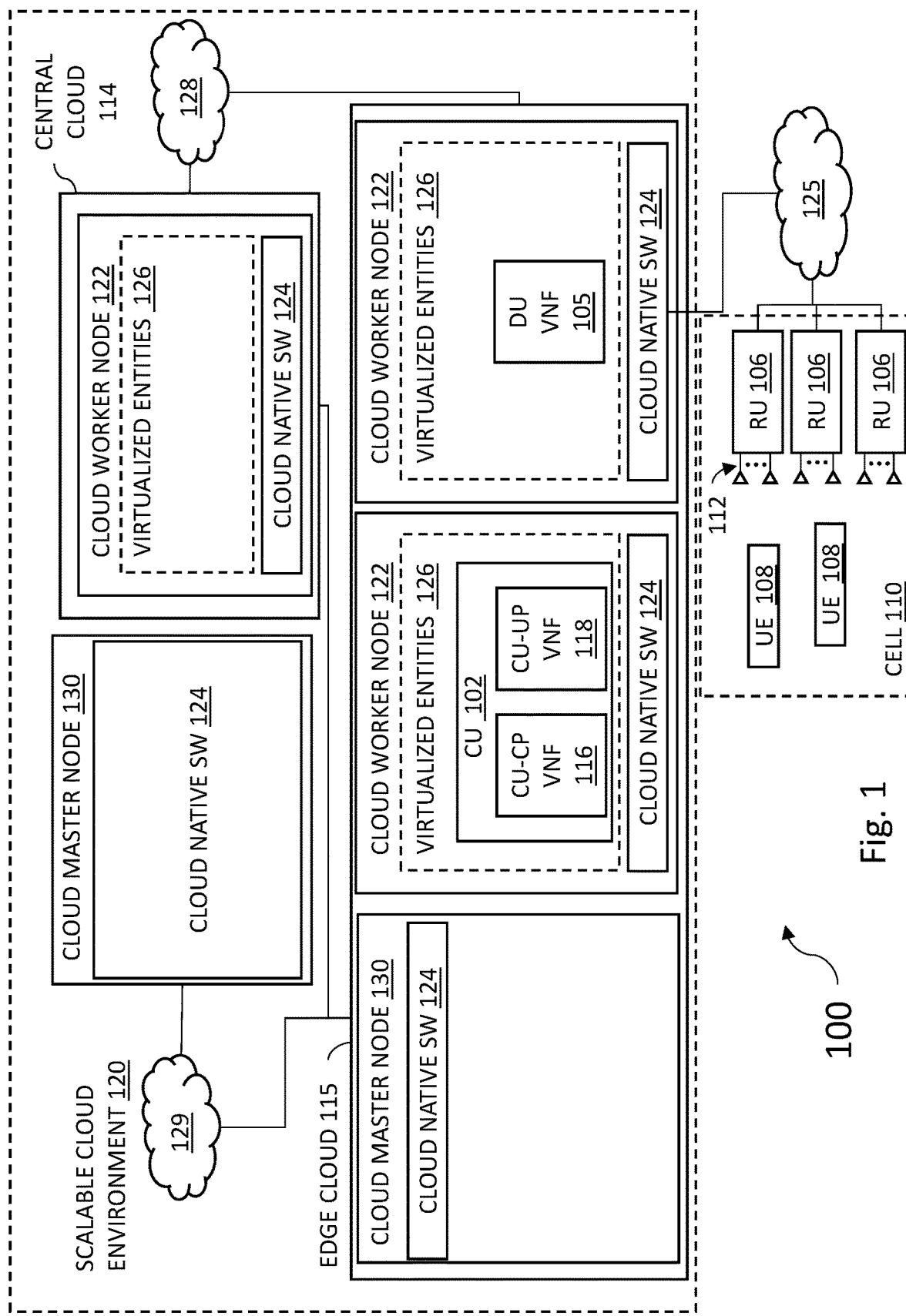
FIG. 1 is a block diagram illustrating one example of a virtualized base station embodiment.

FIG. 1 is a block diagram illustrating one example of a virtualized wireless base station 100 on a VNF hosting platform on which the secure VNF orchestration solutions described herein are provided. The VNF hosting platform comprises a processor (for example, a central processing unit (CPU)) and a memory, which together store and execute code to realize aspects of the virtualized wireless base station 100 in operation. In the context of a fourth generation (4G) Long Term Evolution (LTE) system, a base station 100 may also be referred to as an "evolved NodeB" or "eNodeB," and in the context of a fifth generation (5G) New Radio (NR) system, may also be referred to as a "gNodeB." Base station 100 may be referred to as something else in the context of other wireless interfaces.

In the particular example shown in FIG. 1, the virtualized wireless base station 100 comprises a 5G gNodeB 100 partitioned into one or more central units (CUs) 102, which includes a central unit control-plane (CU-CP) VNF 116 and one or more central unit user-plane (CU-UP) VNFs 118. The gNodeB 100 is further partitioned into one or more distributed units (DUs) 104, which are composed of one or more DU virtual network functions 105, and one or more radio units (RUs) 106. In this example, the virtualized 5G gNodeB 100 is configured so that each CU 102 is configured to serve one or more DU VNFs 105 and each DU VNF 105 is configured to serve one or more RUs 106. In the particular configuration shown in FIG. 1, a single CU 102 serves a single DU VNF 105, and the DU VNF 105 shown in FIG. 1 serves three RUs 106. However, the particular configuration shown in FIG. 1 is only one example. In other embodiments, other numbers of CUs 102, DUs 104, and RUs 106 can be used. Also, the number of DU VNFs 105 served by each CU 102 can vary from CU 102 to CU 102. Likewise, the number of RUs 106 served by each DU 104 can vary from DU VNF 105 to DU VNF 105.

Moreover, although the following embodiments are primarily described as being implemented for use to provide 5G NR service, it is to be understood the techniques described here can be used with other wireless interfaces (for example, fourth generation (4G) Long-Term Evolution (LTE) service) and references to "gNodeB" used in this disclosure can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment).

In general, the virtualized gNodeB 100 is configured to provide wireless service to various numbers of user equipment (UEs) 108 using one or more cells 110 (only one of which is shown in FIG. 1 for ease of illustration). Each RU 106 includes or is coupled to a respective set of one or more antennas 112 via which downlink RF signals are radiated to UEs 108 and via which uplink RF signals transmitted by UEs 108 are received.

In one configuration (used, for example, in indoor deployments), each RU 106 is co-located with its respective set of antennas 112 and is remotely located from the DU VNF 105 and CU 102 serving it as well as the other RUs 106. In another configuration (used, for example, in outdoor deployments), the respective sets of antennas 112 for multiple RUs 106 are deployed together in a sectorized configuration (for example, mounted at the top of a tower or mast), with each set of antennas 112 serving a different sector. In such a sectorized configuration, the RUs 106 need not be co-located with the respective sets of antennas 112 and, for example, can be co-located together (for example, at the base of the tower or mast structure) and, possibly, co-located with its serving DU. Other configurations can be used.

The virtualized gNodeB 100 is implemented using a scalable cloud environment 120 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment 120 can be implemented in various ways.

For example, the scalable cloud environment 120 can be implemented using hardware virtualization, operating system virtualization, and application virtualization (also referred to as containerization) as well as various combinations of two or more of the preceding. The scalable cloud environment 120 can be implemented in other ways. For example, as shown in FIG. 1, the scalable cloud environment 120 is implemented in a distributed manner. That is, the scalable cloud environment 120 is implemented as a distributed scalable cloud environment 120 comprising at least one central cloud 114 and at least one edge cloud 115.

In the example shown in FIG. 1, each RU 106 is implemented as a physical network function (PNF) and is deployed in or near a physical location where radio coverage is to be provided. In this example, each DU 104 is implemented with one or more DU virtual network functions (VNFs) 105 and may be distributed and deployed in a distributed manner in the edge cloud 115. Each CU-CP and CU-UP is implemented as a virtual network function (VNF). In FIG. 1, the CU-CP VNF 116 and CU-UP VNF 118 are centralized and deployed in the edge cloud 115. In other embodiments, one or both may be deployed in the central cloud 114. In the example shown in FIG. 1, the CU 102 (including the CU-CP VNF 116 and CU-UP VNF 118) and the entities used to implement it are communicatively coupled to each DU VNF 105 served by the CU 102 (and the DU VNF(s) 105 used to implement each such DU 104). In some embodiments, one or more of the virtual entities 126 of the central cloud 114 and one or more of the virtual entities 126 of the edge cloud 115, are communicatively coupled over a midhaul network 128 (for example, a network that supports the Internet Protocol (IP)). In the example shown in FIG. 1, each of the DU VNF(s) 105 used to implement a DU 104 are communicatively coupled to each RU 106 served by the DU VNF 105 using a fronthaul network 125 (for example, a switched Ethernet network that supports the IP). In some embodiments, an orchestration and management network 129 is used to couple cloud worker nodes 122 hosting virtualized entities 126 in the edge cloud 115 to a cloud master node 130 that defines an orchestration central cloud (discussed below) that hosts orchestration functions for establishing VNFs on the cloud worker nodes 122 of the edge cloud 115.

The scalable cloud environment 120 comprises one or more cloud worker nodes 122 that are configured to execute cloud native software 124 that, in turn, is configured to instantiate, delete, communicate with, and manage one or more virtualized entities 126 (for example, the CU-CP VNF 116, CU-UP VNF 118 and DU VNF 105). Each of the cloud worker nodes 122 may comprise one or more virtualized entities 126 and a cloud native software 124, the cloud native software 124 may comprise a shared host operating system, and the virtualized entities 126 comprise one or more virtual network functions (VNFs), and each VNF further comprises one or more functional containers. In another example, the cloud worker nodes 122 comprise respective clusters of physical worker nodes, the cloud native software 124 comprises a hypervisor (or similar software), and the virtualized entities 126 comprise virtual machines.

In the example shown in FIG. 1, the scalable cloud environment 120 includes at least one cloud master node 130. There are certain responsibilities that the cloud master node 130 has as far as instantiation and clustering of cloud worker nodes 122. The cloud master node 130 is configured to implement management and control plane processes for the worker nodes 122 in a cluster. In some examples, the cloud master node 130 is configured to determine what runs on each of the cloud worker nodes 122, which can include scheduling, resource allocation, state maintenance, and monitoring. In some examples, the cloud master node is configured to manage the lifecycle, scaling, and upgrades of workloads (such as containerized applications) on the cloud worker nodes 122. In some embodiments, a cloud master node 130 may be coupled to the edge cloud 115 an orchestration and management network 129 (which may be distinct from the backhaul network 128) to provide orchestration function to install and implement any of the virtualized entities 126 discussed herein. In some embodiments, orchestration central cloud functions for edge cloud orchestration can be accessed by the cloud worker nodes 122 (of either the central or edge clouds) through an IPsec tunnel established via the orchestration and management network 129.

Each of the virtual network functions, DU VNF 105, CU-CP VNF 116, and CU-UP VNF 118 is implemented as a software virtualized entity 226 that is executed in the scalable cloud environment 120 on a cloud worker node 122 under the control of the cloud native software 124 executing on that cloud worker node 122. In the following description, a cloud worker node 122 that implements at least a part of a CU 102 (for example, a CU-CP VNF 116 and/or a CU-UP VNF 118) is also referred to here as a "CU cloud worker node" 122, and a cloud worker node 122 that implements at least a part of a DU VNF 105 is also referred to here as a "DU cloud worker node" 122.

In the example embodiment of gNodeB 100, the CU-CP VNF 116 and the CU-UP VNF 118 are each implemented as a respective virtualized entity 126 executing on the same cloud worker node 122. The DU VNF 105 may be implemented as a virtualized entity 126 executing on the same cloud worker node 122 or a different cloud worker node 122. In other configurations and examples, the CU 102 can be implemented using multiple CU-UP VNFs 118 using multiple virtualized entities 126 executing on one or more cloud worker nodes 122. In another example, multiple DU VNFs 105 (using multiple virtualized entities 126 executing on one or more cloud worker nodes 122) can be used to serve a cell, where each of the multiple DU VNFs 105 serves a different set of RUs 106. Moreover, it is to be understood that the CU 102 and DU VNF 105 can be implemented in the same cloud (for example, together in an edge cloud 115). Other configurations and examples can be implemented in other ways.

Bringing a virtualized gNodeB (such as virtualized gNodeB 100) up to service is generally performed in multiple stages by a variety of entities. The virtualization infrastructure/environment for gNodeB VNFs is brought up from a bare metal servers and relevant network and storage equipment (for example, using platform orchestration through an edge cloud node management network or controller). The gNodeB VNFs are then deployed and orchestrated into service providing entities (for example, using service orchestration through a virtual network function manager (VNFM)). The gNodeB VNFs are also configured and activated to make them service ready (for example, using service configuration with an Operations and Maintenance (OAM) entity or Device Management System (DMS)). When deploying and managing gNodeB VNFs, the location of the network elements determines the different networking and security requirements. When the virtual network functions (VNFs) used to implement a virtualized gNodeB are outside a trusted network (for example, outside the operator's mobile core network), a tunnel mode of Internet Protocol Security (IPsec) can generally be used between the VNF and each trusted network that communicates data with the VNF. Alternatively, if any two entities communicate with each other via client-server type of accessing, transport layer security (TLS) or Hypertext Transfer Protocol Secure (HTTPS) can be applied.

This disclosure presents a comprehensive public key infrastructure (PKI) certificate and private key acquisition procedure for VNF based gNodeB orchestration and operation in all three stages of: 1) virtualization infrastructure orchestration/management; 2) VNFs service orchestration/management; and 3) VNFs service configuration and activation. In some embodiments, the open-source stack StarlingX framework is used to serve the virtualization infrastructure orchestration/management functions. In some embodiments, Kubernetes (K8s) is utilized to provide the VNFs service orchestration/management functions. The VNFs service configuration and activation functions may be provided by a small cell Device Management System (DMS) such as, but not limited to, the CommScope, Inc. Device Management System.

Figure 2:
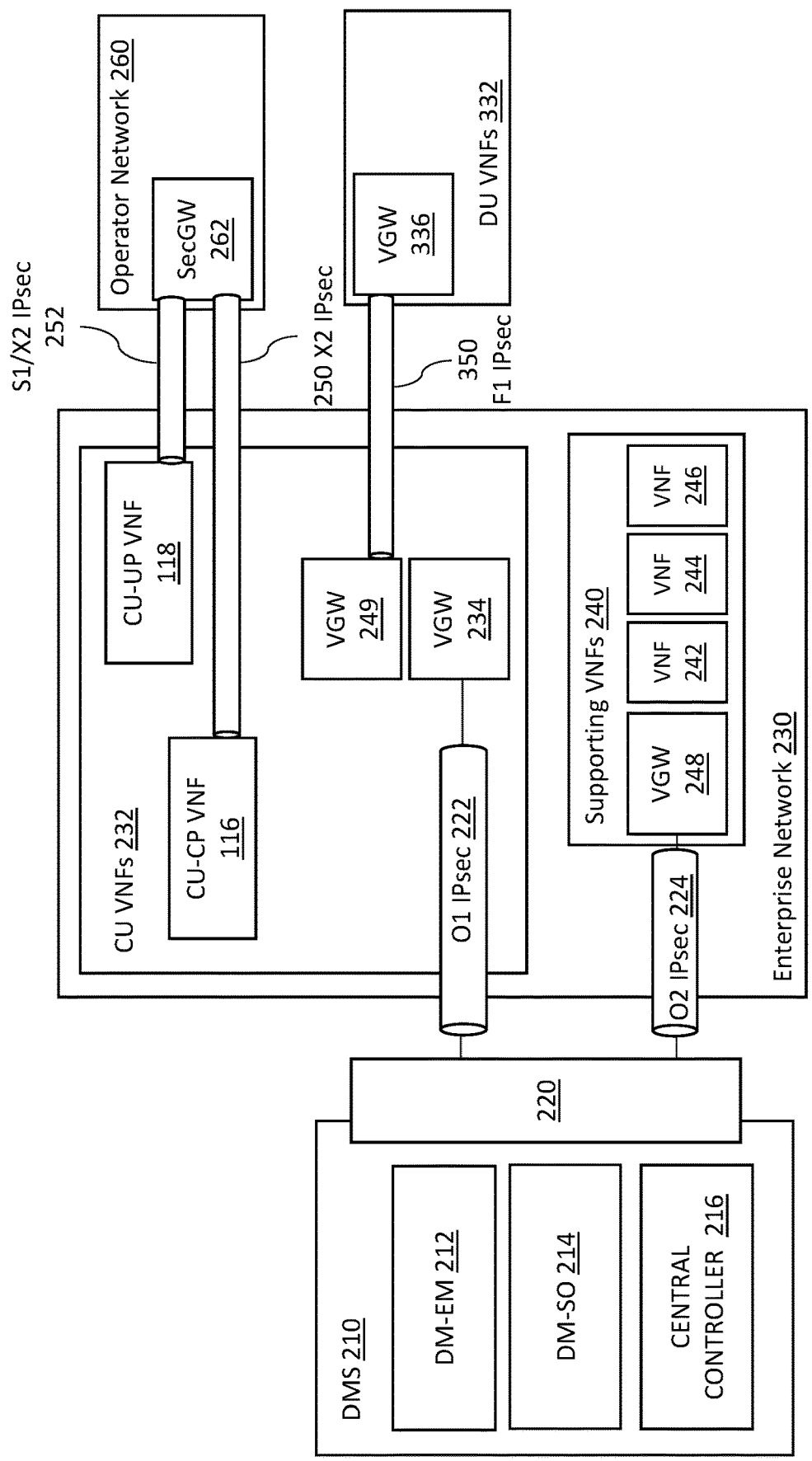
FIGS. 2 and 3 illustrate IPsec tunnels for one example of a virtualized base station embodiment.

FIG. 2 is a diagram of an example gNodeB 200 use case that illustrates the IPsec tunnel needs for a VNF for a gNodeB CU. In this example, the gNodeB 200 comprises a DMS 210 that includes a DM-EM 212 for service management, a DMS-SO 214 to manage orchestration, and a central controller 216, which executes software (for example, StarlingX) to serve the virtualization infrastructure orchestration/management functions. The DMS 210 utilizes IPSec tunnels to communicate with various elements implemented on at least one enterprise network 230. As shown in FIG. 2, those elements comprise one or more gNodeB-CU VNFs 232 that include at least one CU-CP VNF 116 and at least one CU-UP VNF 118, each of which include an IPsec client. Also implemented on the enterprise network 230 are one or more supporting VNFs 240, which may include at least a VNF service orchestration/management master VNF 242, log collection VNF 244, and an image repository VNF 246.

As illustrated in FIG. 2, the DMS 210 communicates with the gNodeB-CU VNFs 232 and supporting VNFs 240 via IPSec tunnels. More specifically, the DMS 210 may include, or otherwise be coupled to, an OAM secure gateway 220 (for example, a VPN gateway) that establishes an O1 IPSec tunnel 222 to the gNodeB-CU VNFs 232. A corresponding IPsec virtual gateway (VGW) 234 is implemented to establish an endpoint for the O1 IPSec tunnel 222 for the gNodeB-CU VNFs 232. Similarly, the OAM secure gateway 220 establishes an O2 IPSec tunnel 224 to the supporting VNFs 240. A corresponding IPsec VGW 248 is implemented to establish an endpoint for the O2 IPSec tunnel 224 for the supporting VNFs 240. IPSec tunnels are also implemented between the one or more CU-CP VNF 116 and CU-UP VNF 118 and an operator network 260 of the entity that operates the gNodeB 200. In FIG. 2, the operator network 260 communicates with the CU-CP VNF 116 via an X2 IPSec tunnel 250 and with the CU-UP VNF 118 via an S1/X2 IPSec tunnel 252. In some embodiments, the operator network 260 comprises a security gateway (SecGW) 262 for implementing the X2 IPSec tunnel 250 and S1/X2 IPSec tunnel 252. In summary, the O2 IPsec tunnel 224 is established and utilized for infrastructure and service orchestration, the O1 IPsec tunnel 222 is established and utilized for service configuration, and the X2 IPsec tunnel 250 and S1/X2 IPsec tunnel 252 is utilized for gNodeB operations. FIG. 2 also illustrates the option of gNodeB-CU VNFs 232 further comprising a VGW 249 for optionally implementing an additional F1 IPsec tunnel 350 with a VGW 336 of the DU VNFs 332, as will be discussed below with respect to FIG. 3.

Figure 3:
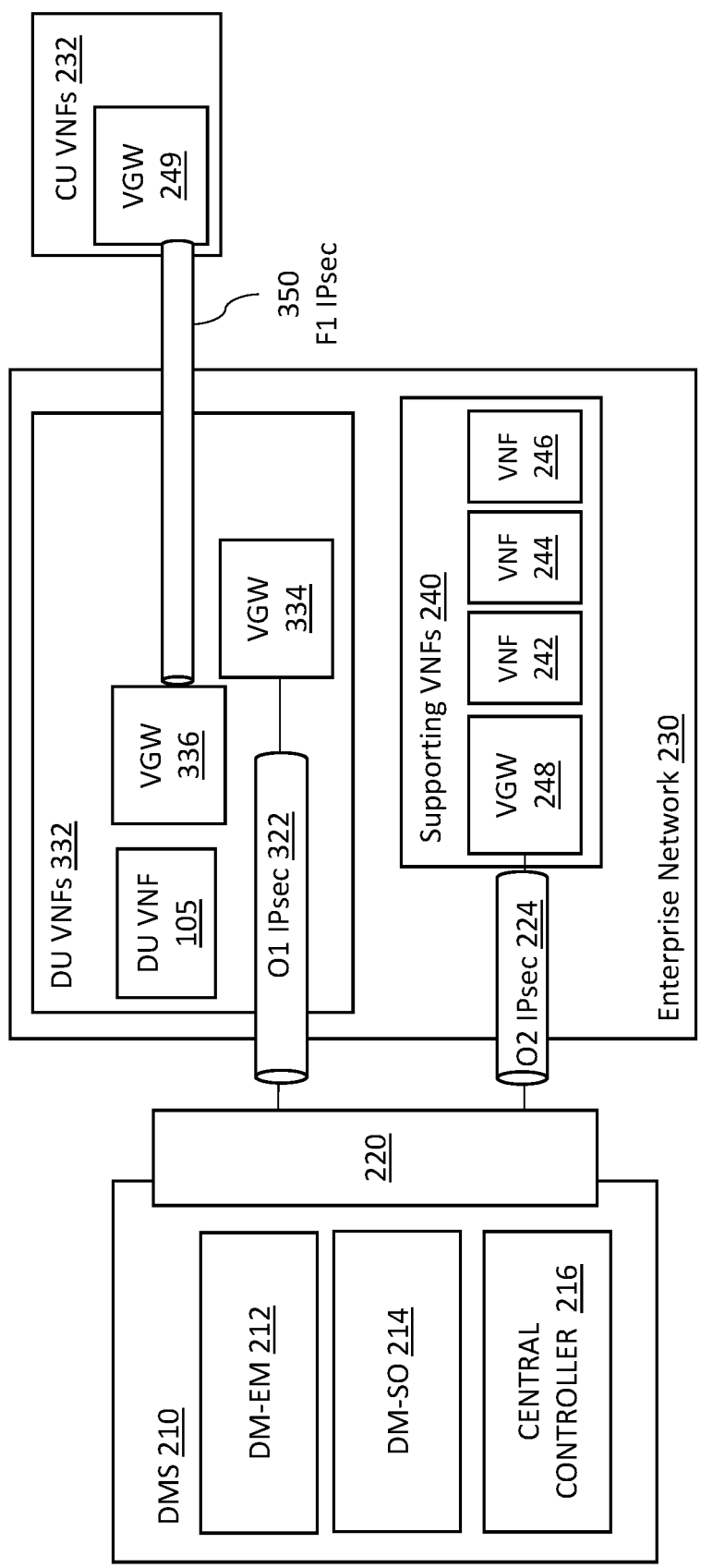

FIG. 3 is a diagram of an example gNodeB 300 use case that illustrates the IPsec tunnel needs for a VNF of a gNodeB DU VNF 105. In this example, the gNodeB 300 comprises the DMS 210 and the OAM secure gateway 220 discussed above from FIG. 2.

Here, the DMS 210 utilizes IPSec tunnels to further communicate with one or more gNodeB-DU VNFs 332. As illustrated in FIG. 3, the DMS 210 includes, or is otherwise coupled to, the OAM secure gateway 220 that further establishes an O1 IPSec tunnel 322 to the gNodeB-DU VNFs 332. A corresponding IPsec VGW 334 is implemented to establish an endpoint for the O1 IPSec tunnel 322 for the gNodeB-DU VNFs 332. Similarly, the OAM secure gateway 220 establishes an O2 IPSec tunnel 224 to the supporting VNFs 240. A corresponding IPsec VGW 248 is implemented to establish an endpoint for the O2 IPSec tunnel 224 for the supporting VNFs 240. An F1 IPSec tunnel 350 is also optionally implemented between the one or more CU VNFs 232 (for example, CU-CP VNF 116 and/or CU-UP VNF 118) and the gNodeB-DU VNFs 332. An IPsec VGW 336 is implemented to establish an endpoint for the F1 IPSec tunnel 350 for the gNodeB-DU VNFs 332 and a corresponding IPsec VGW 249 is implemented to establish an endpoint for the F1 IPSec tunnel 350 for the gNodeB-CU VNFs 232. More specifically, the gNodeB-DU VNFs 332 may comprise a first IPsec VGW 336 to establish the F1 IPSec tunnel 350 and a second IPsec VGW 334 to establish the O1 IPSec tunnel 322. In summary, the O2 IPsec tunnel 224 is established and utilized for infrastructure and service orchestration, the O1 IPsec tunnel 322 is utilized for service configuration, and the optional F1 IPsec tunnel 350 is utilized for communications between the DU VNF 105 and the CU 102 (for example, CU-CP VNF 116 and/or CU-UP VNF 118).

Figure 4A:
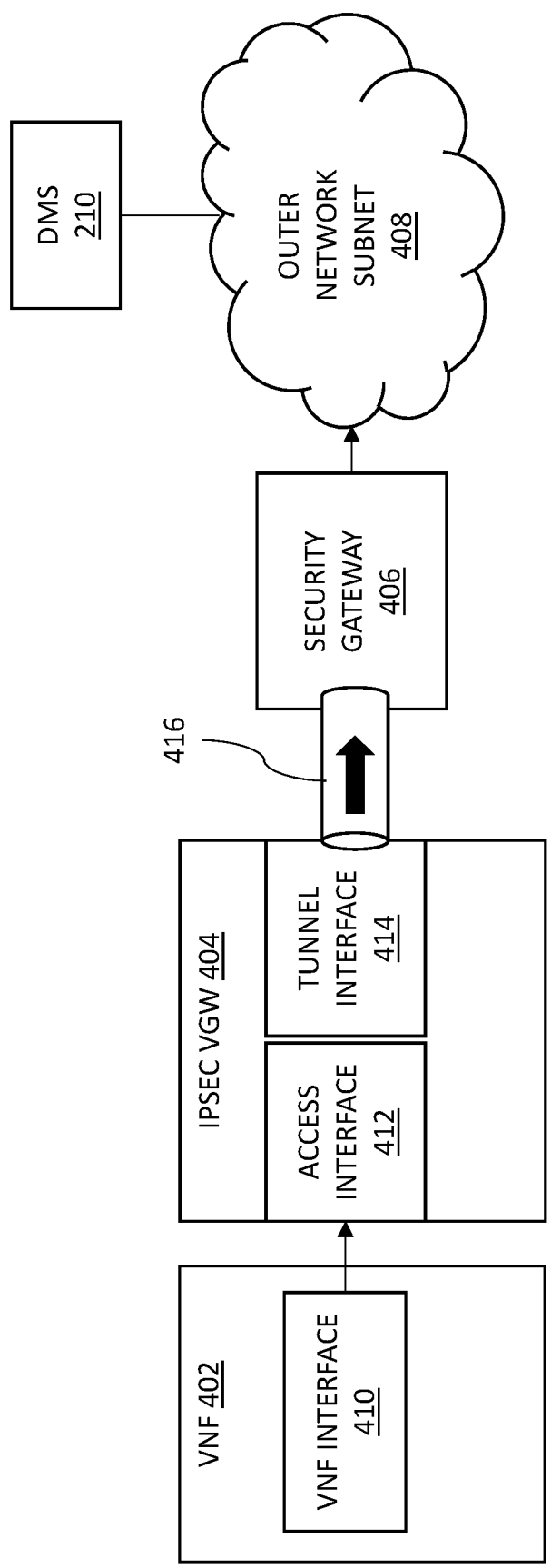
FIGS. 4A and 4B illustrate example VNF traffic flows through an IPsec tunnel.
Figure 4B:
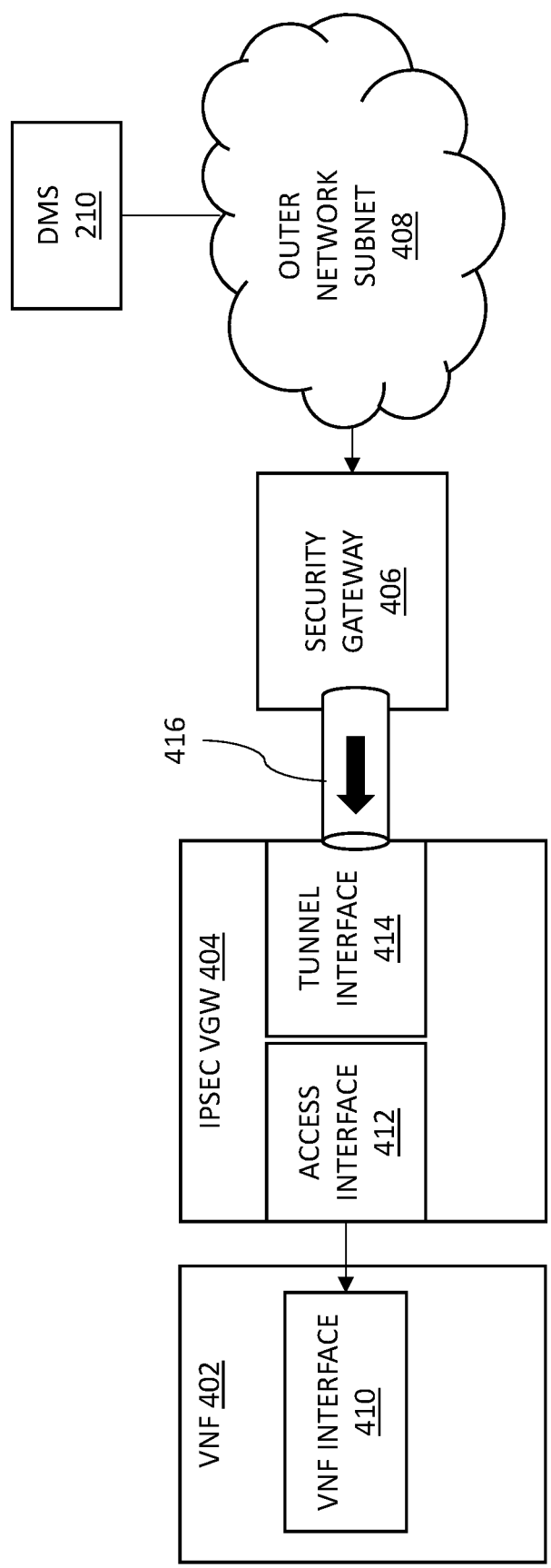

FIGS. 4A-4B illustrate a general example of incoming and outgoing traffic flows of traffic for an IPsec virtual gateway and IPsec tunnels, such as any of those with respect to FIG. 2 or 3, or otherwise discussed in this disclosure. It should be understood that an IPsec virtual gateway (VGW) can be used for communicating and routing any type of traffic for a virtualized 5G gNodeB. For example, an IPsec virtual gateway can be used to routing O1 traffic, O2 traffic, X2-C traffic, X2-U/S1-U traffic, F1-C traffic, F1-U traffic, or other types of traffic utilized for a virtualized 5G gNodeB or other base station. In the IPsec tunnel mode, the full IP packets between the VNF 402 and the external endpoints are fully encapsulated into the IPsec tunnel IP packets and transported through the tunnel. Accordingly, the VNF 402 and external endpoint IP addresses are typically referred as inner IP addresses.

The example shown in FIG. 4A illustrates outgoing traffic from a VNF 402 of the gNodeB 100 being provided to an external network 408 via the IPsec virtual gateway 404. In the example shown in FIG. 4A, the VNF 402 (which could be any of CU-CP VNF 116, CU-UP VNF 118, or DU VNF 105) is a VNF that includes an VNF network interface 410 and is configured to transmit IP packets to an access network interface 412 of the IPsec virtual gateway 404. The IPsec virtual gateway 404 is configured to encapsulate and encrypt the IP packets and transmit the encapsulated IP packets via the tunnel network interface 414 using an IPsec tunnel 416. The encapsulated IP packets are received at the security gateway 406 of the external network, and the security gateway is configured to decrypt the original IP packets from the encapsulated IP packets. The security gateway 406 is also configured to route the IP packets to an end point (for example, DMS 210) in the outer network subnet 408 using the IP address of the end point.

The example shown in FIG. 4B illustrates incoming traffic from the outer network 408 being provided to VNF 402 via the IPsec virtual gateway 404. In the example shown in FIG. 4B, the endpoint of an outer network 408 is configured to transmit IP packets to the security gateway 406. The security gateway 406 is configured to encrypt and encapsulate the IP packets and transmit the encapsulated IP packets to the IPsec virtual gateway 404. The encapsulated IP packets are received at the tunnel network interface 414 of the IPsec virtual gateway 404, and the IPsec virtual gateway 404 is configured to decrypt the encapsulated IP packets. The IPsec virtual gateway 404 is configured to route the IP packets to the VNF network interface 410 of the VNF 402 (for example, CU-CP VNF 116, CU-UP VNF 118, or DU VNF 105) using the IP address of the VNF network interface 410 of the VNF 402.

In some examples, the VNF network interface 410 of the VNF 402 and the access network interface 412 of the IPsec virtual gateway 404 are assigned an IPv6 address, and the tunnel network interface 414 of the IPsec virtual gateway is assigned an IPv4 address. In such examples, the security gateway 406 is assigned an IPv4 address on the tunnel trunk side and the end points in the attached subnet 408 are assigned IPv6 addresses. In other examples, the VNF network interface 410 of the application VNF 402 and the access network interface 412 of the IPsec virtual gateway 404 are assigned an IPv4 address, and the tunnel network interface 414 of the IPsec virtual gateway is assigned an IPv6 address. In such examples, the security gateway 406 is assigned an IPv6 address on the tunnel trunk side and the end points in the attached subnet 408 are assigned IPv4 addresses.

As discussed above, one or more of the embodiments presented herein disclose a public key infrastructure (PKI) architecture with procedures for VNF based virtual base station orchestration and operation. Certificates and keys utilized for virtual base station orchestration and operations may include (but are not limited to) the following:

1) A virtual infrastructure orchestration/management (VIM) certificate and private key. The VIM certificate and private key are used for securing access between an orchestration central cloud which comprises VIM functions (illustrated at 510 in FIG. 5 and discussed below) and a managed virtual base station edge cloud 115 (which comprises the Virtualized Entities 126 and VNFs). The VIM certificate and private key can be used either for establishing IPsec tunnels, or as the client TLS certificates, depending on the deployment options.

2) Virtual network functions (VNFs) service orchestration/management (VNFM) operation certificates and private keys. In one embodiment, a pair of root or sub certification authority (CA) certificate and private key is utilized by the VNF service orchestration/management functions to issue VNFM operation certificates and keys. This root/sub-CA certificate and private key can be either acquired from an external certificate authority (CA), or generated by a master node of the orchestration central cloud 510 that executes the VNF service orchestration/management functions. In one implementation, Kubernetes (K8s) is used for this purpose and the pair of root or sub CA certificate and private key is used by Kubernetes to issue its VNFM operation certificates and keys. In that case, the root/sub-CA certificate and private key can be either acquired from an external CA, or generated by the Kubernetes master node.

3) Certificates and private keys for IPsec tunnels to the mobile network operator security gateway in front of the operator owned CA (for example, between gNodeB VNFs (CU-CP VNF 116, CU-UP VNF 118, DU VNF 105) and the operator network 360 CA security gateway). Mobile network operators typically operate their own security CAs for managing the IPsec tunnel certificates and keys for X2 and S1 interfaces (such as for IPsec tunnels 250 and 252). These operator CAs are typically behind the network operator's security gateway 262 and can only be accessed through the IPsec tunnels 250 and 252, and thus corresponding IPsec tunnel certificate and private keys are utilized as well.

4) Certificates and keys for the O1 and X2/S1 interface IPsec tunnels. These keys and certificates are utilized by the Virtualized Entities 126 (for example, gNodeB VNFs such as CU-CP VNF 116, CU-UP VNF 118, or DU VNF 105) to communicate with an external DMS 210 (which may comprise an OAM entity) over an O1 interface (such as for IPsec tunnels 222 or 322) or for other IPsec tunnels such as for a peer LTE MeNB (for example, a master eNB) over an X2 interface or an operator's mobile core over an S1 interface, in secured ways. For these O1, X2 and S1 IPsec tunnel interfaces, IPsec certificates and keys are also utilized.

5) Certificates and keys for other supporting services for base station operation. Other support services may utilize certificates and keys to secure communications. For example, an event log aggregator (such as the Fluentd cross-platform data collection software), or traffic management software (such NGINX service access software) utilize a support service certificate and private key.

6) DU client certificate and private key. For example, a DU VNF 105 may include a Netconf TLS client for accessing a RU 106 management plane that utilizes a certificate and private key.

In supporting the overall VNF based gNodeB secure operations, there may be multiple PKI CAs to provide the above-mentioned certificates and private keys. In a very typical example use case, network operators exercise control over access to of any of their mobile core resources and leave all other functions such as orchestration and management to other professional providers. In some of the procedures disclosed herein, the X2 and S1 interface IPsec tunnels' (250, 252) keys and certificates are provided and managed by the network operator's CA. Other keys and certificates are provided and managed by a global CA (illustrated at 516 in FIG. 5 and discussed below). In the disclosed procedures described below, this example use case is assumed. However, this does not preclude any other implementations utilizing other CA because the logics and procedures disclosed herein still hold to be true.

Figure 5:
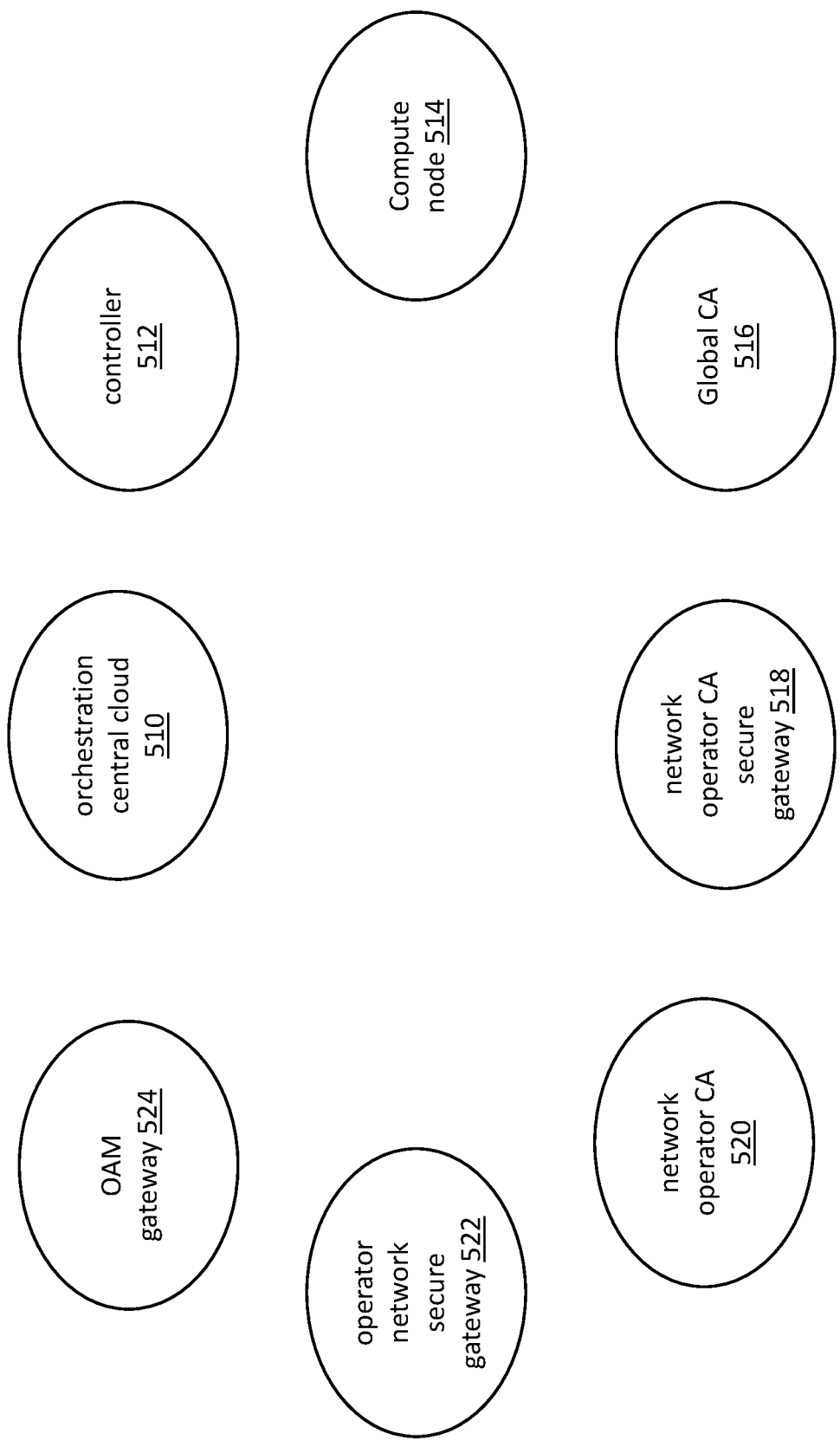
FIG. 5 is a diagram illustrating entities utilized in the VNF orchestration processes of one example embodiment.

As illustrated in FIG. 5, there are 8 major entities in the processes disclosed and discussed below. These entities include: 1) an orchestration central cloud 510 (Virtual infrastructure orchestration/management (VIM) and Virtual network functions (VNFs) service orchestration/management (VNFM) functional elements); 2) a controller 512 (a node in the edge cloud 115 that functions as the edge cloud 115 controller. This controller 112 node may also function as a Kubernetes master and gNodeB CU node hosting the CU-CP VNF 116 and CU-UP VNF 118 in this example); 3) at least one compute node 514 (these are nodes in the edge cloud 115 that act as pure compute functions. The compute nodes may also function as Kubernetes workers and the gNodeB DU node(s) hosting the DU VNF 105. Both the controller 512 and compute node may comprise server hardware that includes a processor and memory programed to execute and implement the various functions, processes, and VNFs described herein); 4) a global CA 516 (for example, a PKI server); 5) a network operator CA secure gateway 518 (for example, this may be implemented by secure gateway 262 in FIG. 2 or a separate gateway) for accessing the network operator CA; 6) a network operator CA 520 (for example, the mobile network operator operated certificate authority. In some implementations the network operator CA 520 may utilize the CMPv2 protocol for managing the operator controlled IPsec certificates and keys for the X1 and S2 interfaces with the gNodeB VNFs); 7) an operator network secure gateway 522 (for example, secure gateway 262 in FIG. 2) for the gNodeB VNFs to access the operator mobile network's S1 and X2 interface functions; and 8) an OAM gateway 524 (for example secure gateway 220 in FIG. 2) which functions as an IPsec gateway for VNFs to access OAM functions over the O1 tunnel 222 and 322 interfaces.

In some embodiments, off-the-shelf bare metal server hardware may be used for the controller 512 and compute 514 nodes that will ultimately host the virtualized entities 126 (gNodeB VNFs such as CU-CP VNF 116, CU-UP VNF 118 and DU VNF 105 for example). For bootstrapping security reasons, it is desirable that this bare metal hardware not include customizations for built-in secrets that would be leveraged for establishing trust in field certificate provisioning. Therefore, a set of obfuscated global certificate and private key used by a PKI client application (which may comprise a PKI SDK library) in communications with the global CA server 516 can instead be loaded at the time of installation. Obfuscation methods to protect the global certificate and private key can include any industry or proprietary solutions such, but not limited to, N-Mesh, a hardware security module (HSM) and the like. This set comprising a global certificate and private key is utilized for authenticating the very first bootup time access to the global CA 516 PKI server to acquire the first set of PKI server assigned certificate and private key that is used in the subsequent gNodeB orchestration, configuration, and operations. This first global CA 516 PKI server assigned global certificate and private key is also referred to herein as the PKI signing certificate and private key.

It should be appreciated that different ways of utilizing the global certificate and private key may yield different solution options. For example, in a first implementation option only the controller 512 node within the edge cloud 115 is allowed to use the global certificate and private key to access the global CA 516 PKI server on bootup. Subsequent PKI server accesses from other hosting nodes (for example, nodes 514) or the VNFs use an authorization token generated by the controller 512 node. This first option provides a centralized authorization token-based solution. In a second implementation option, the VNF hosting nodes (node 512 and node 514) within the edge cloud 115 each use the global certificate and private key to access the global CA 516 PKI server on bootup to respectively acquire a dedicated set of assigned digital certificate and private key. This dedicated set of PKI server assigned certificate and private key are then used for signing subsequent PKI requests from VNFs hosted on the respective node. This second options provides a distributed signing key-based solution.

In order to satisfy the needs of the above security certificates and keys and simplify the acquisition process, the certificates and keys can be classified into one of the categories of node level certificates and keys and VNF level certificates and keys. Each set of certificates and keys can serve multiple purposes at the respective levels. Example use case of these two levels and the respective usages in a VNF based virtual base station orchestration and operations are discussed below.

Node level certificates and keys. Node level sets of a certificate and private key are used by each node (whether controller 512 or compute nodes 514) that hosts virtualized entities 126 (including gNodeB VNFs, CU-CP VNF 116, CU-UP VNF 118 and DU VNF 105 and supporting functions) and are acquired from the Global CA 516 through PKI requests signed using the obfuscated global private key and certificate. For a node implementing a CU VNF (such as node 232) a node level certificate and private key may be used to establish orchestration central cloud 510 communications (using O2 IPsec and/or TLS/SSH access), O1 IPsec tunnel 222 communications with DMS 210, O1 IPsec tunnel communications between a CU node's virtual security gateway (for example, VGW 234) and an external security gateway, secure access to supporting services (for example, Kafka and Nginx services) and as a signing key for subsequent PKI requests. For a node implementing a DU VNF (such as node 332), a node level certificate and private key may be used to establish OAM/O1 IPsec tunnel 322 communications with DMS 210, O1 IPsec tunnel communications between a DU node's virtual security gateway (for example, VGW 334) and an external security gateway, secure access to supporting services (for example, Kafka and Nginx services), and as a signing key for subsequent PKI requests.

VNF level certificates and keys. VNF level sets of a certificate and private key are used by each gNodeB VNF (such as CU-CP VNF 116, CU-UP VNF 118 and DU VNF 105 and supporting functions) and are acquired from the global CA 516 through PKI requests signed using either the obfuscated global key and certificate or the first set of node level certificate and private key obtained from the global CA acting as the PKI request signing key and certificate. For a node implementing a CU-CP VNF (such as node 232) a VNF level certificate and private key may be used to establish an IPsec tunnel with a network operator CA 520. For example, a VNF level certificate and private key may be used in an implementation where an operator CA 520 exists and is accessed via the operator CA secure gateway 518 to get a X2-C IPsec certificate and private key. Alternatively, a VNF level certificate and private key may be used as a X2-C IPsec certificate and private key where an operator CA 520 does not exist. A VNF level certificate and private key may be used in conjunction with a CU-CP VNF 116 Fluentd client, or to establish an F1-C IPsec tunnel.

For a node implementing a CU-UP VNF (such as node 232), a VNF level certificate and private key may be used to establish an IPsec tunnel with an operator CA 520. For example, a VNF level certificate and private key may be used in an implementation where an operator CA 520 exists and is accessed via the operator CA secure gateway 518 to get a X2-U/S1-U IPsec certificate and private key. Alternatively, a VNF level certificate and private key may be used as a X2-U/S1-U IPsec certificate and private key where an operator CA 520 does not exist. A VNF level certificate and private key may be used in conjunction with a CU-UP VNF 118 Fluentd client.

For a node implementing a DU VNF (such as node 332) a VNF level certificate and private key may be used in conjunction with a DU VNF 105 Fluentd client, a DU management plane Netconf TLS client, or to establish an F1-C IPsec tunnel.

FIGS. 6A-6F illustrate a process 600 is illustrated for the centralized authorization token-based certificates and keys acquisition, referred to previously in this disclosure as the first option.

Initial certificates and keys acquisition procedure. In process 600, the controller 512 is the node resident in the edge cloud 115 responsible for acquiring the first set of digital certificate and private key. This first set of certificate and private key serves multiple purposes: for accessing the orchestration central cloud 510 orchestration functions and acting as the signing key of the authorization tokens used in other subsequent PKI requests (as described in FIGS. 6C, 6D, 7A and 7B). This set of certificate and private key is named the orchestration controller certificate and private key for the authorization token signing purpose. When invoking PKI procedures with the global CA 516, PKI requests from all other nodes or VNFs within the edge cloud 115 are all initially triggered by the controller 512 with authorization tokens generated by the controller 512. The authorization token is recognized by the global CA 516 and acts as an additional level of security protection to the global CA's certificate issuance and key management functions in addition to the basic protection that uses the obfuscated global certificate and private key to sign PKI requests sent to the global CA 516. The global certificate and signature with a private key in each PKI request provide assurance that the request came from an authorized software component. Authorization token mechanism provides additional assurance that the requesting software component is coupled with an authorized controller. When generating the authorization token, the controller 512 takes a timestamp, appropriate entity identification (for example, FQDN or VNF-ID) and optionally other relevant information as input parameters. The authorization token is signed by the controller 512 using the orchestration controller key and sent to the global CA 516 accessing entity (for example, other nodes within the edge cloud or VNFs) in, for example, certificate/key update requests. Upon receiving the certificate and private key update requests, the global CA 516 accessing entity includes the controller 512 signed authorization token into the PKI requests (for example, the certificate and private key requests) and signs the request using the global private key and sends the requests to the global CA 516. On receiving such requests, the global CA 516 validates the signatures of the requests, the authorization tokens within and that the timestamps are within the pre-determined expiration time and responds when all conditions are valid.

Figure 6A:
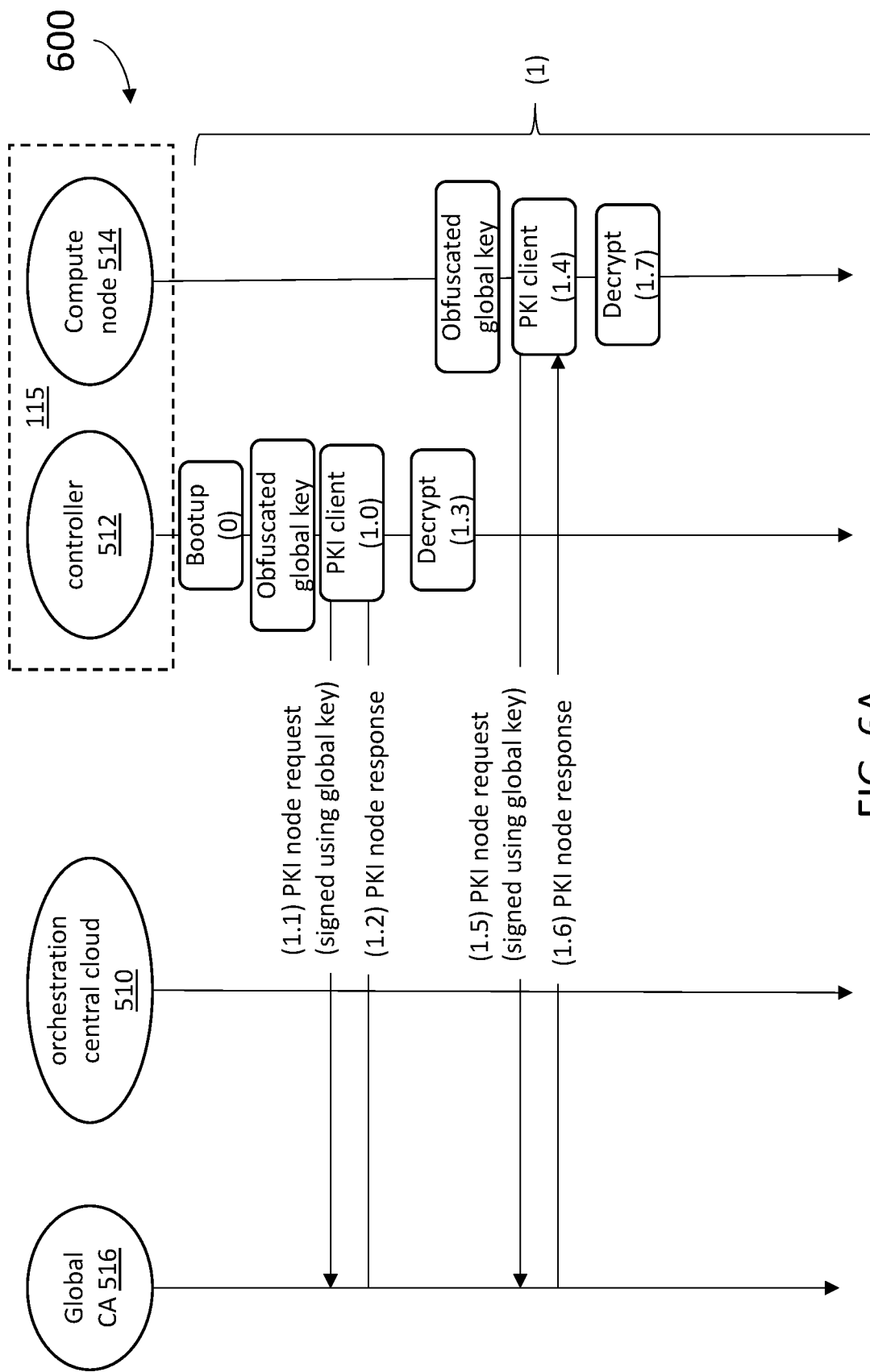
FIGS. 6A-6F illustrate an example process embodiment for centralized authorization token-based certificates and keys acquisition.

Beginning with FIG. 6A, the initial bootup steps of process 600 are illustrated. Beginning at (0), the controller 512 node in the edge cloud 115 boots up with a pre-configured fully qualified domain name (FQDN) and a set of obfuscated global certificate and private key. In segment (1) of process 600, the controller 512 node obtains a node certificate and private key. The procedure proceeds to (1.0) where the controller 512 executes a PKI client application for acquiring the node certificate and private key from the global CA 516. This set of certificate and private key will also act as PKI signing certificate and private key to sign the subsequent certificate and private key acquisition requests. At (1.1), a digital certificate and private key request for acquiring the node certificate and private key (also known as the PKI signing certificate and private key) is sent by the controller 512 to the global CA 515. The digital certificate and private key request (1.1) uses the FQDN of the controller 512 as the certificate and private key identifier, includes a randomly generated client key agreement public key X and is signed using the global certificate and private key obfuscated within the PKI client application. Client also generates a key agreement private key x that corresponds to X. At (1.2), the controller 512 receives from the global CA 516 the digital certificate and private key response comprising the node level certificate and double-encrypted private key along with the global CA's key agreement public key Y.

Figure 5A:
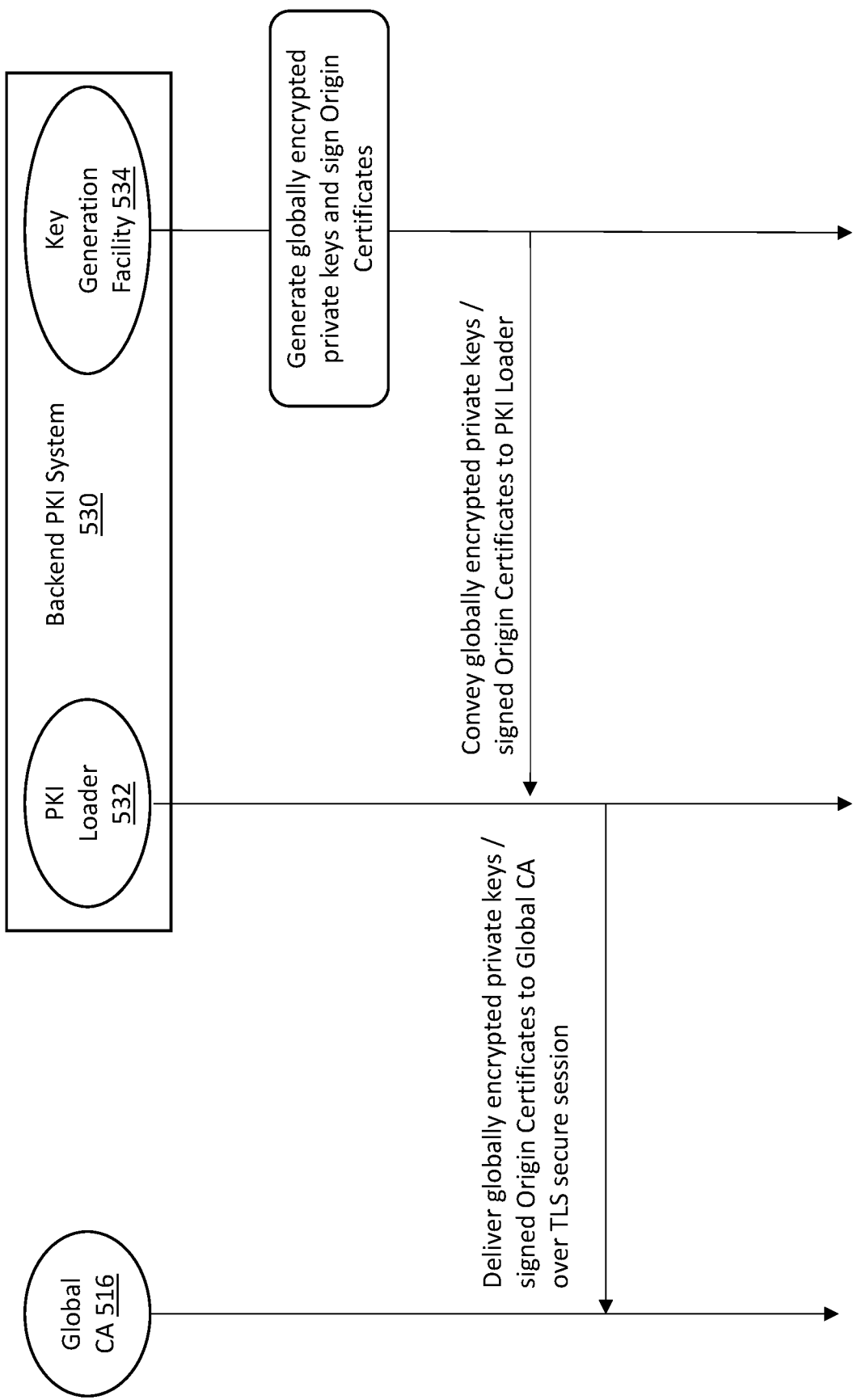
FIG. 5A is a diagram illustrating an example backend PKI system embodiment.

The private key may be pre-loaded into a global CA 516 database with global key encryption that was applied in a backend PKI system 530. Along with that encrypted private key, the global CA 516 has a preloaded Origin Certificate. Illustrated in FIG. 5A, the backend PKI system 530 may comprise a PKI Loader 532 and Key Generation Facility 534. The Key Generation Facility 534 functions to generate globally encrypted private keys and also signs Origin Certificates. These are conveyed to the PKI Loader 532 and then securely transmitted to the Global CA 516, for example, over a TLS secure session. The Origin Certificate includes a public key matching to the private key and may further include descriptive attributes that are transferred to the final device digital certificate which is signed and returned back to the controller 512. The certificate returned to the controller 512 also includes the FQDN from the request.

The global CA 516 generates its key agreement private key "y" and public key "Y", computes a shared encryption key "SK" as a function of y and X and uses SK for double-encrypting the private key returned in the response 1.2 (on top of encryption that was already applied by the backend PKI System 530). As an example, if the key agreement algorithm is Elliptic Curve Diffie-Hellman (ECDH), then SK=y*X where symbol '*' denotes a special Elliptic Curve multiply operation known in the art of cryptography. Another example of a key agreement algorithm is Diffie-Helman (DH), where SK=$X^y$ mod p, where p is a large prime number. This same key agreement mechanism is applied to all PKI responses from the Global CA. It should be understood that other key agreement algorithm may be utilized.

This set of certificate and private key may be used for all node level of security needs, for example, base station infrastructure orchestration, PKI request signing, OAM/O1 IPsec tunnels, and Kafka & Nginx services. At (1.3), the controller 512 decrypts and stores the node certificate and private key.

In order to decrypt the private key, the controller 512 computes the same shared encryption key SK but as a function of x and Y. For instance, if the key agreement algorithm is ECDH, then SK=x*Y where symbol '*' denotes a special Elliptic Curve multiply operation known in the art of cryptography. Another example of a key agreement algorithm is DH, where SK=$Y_x$ mod p, where p is a large prime number. This same key agreement mechanism is applied to all PKI responses from the Global CA.

Decryption with SK removes the outer layer encryption based on key agreement from the private key. In addition, controller 512 also removes the inner-layer encryption that was originally applied at the Backend PKI System. The utilized decryption key may be obfuscated in software or preferably protected in a secure hardware element of the controller 512.

At (1.4), similar procedures are executed for acquiring the node certificate and key on each of the compute nodes 514. At (1.5), a certificate and key request for acquiring the node certificate and private key is sent by a compute node 514 to the global CA 515. The certificate and private key request (1.5) uses the FQDN of the compute node 514 as the certificate and private key identifier, includes a randomly generated client key agreement public key X and is signed using the global private key within the PKI client application. At (1.6), the compute node 514 receives from the global CA 516 the certificate and private key response comprising the node level certificate and double-encrypted private key along with the global CA's key agreement public key Y. This set of certificate and private key may be used for all node level security needs, for example, base station infrastructure orchestration, PKI request signing, OAM/O1 IPsec tunnels, and Kafka & Nginx HTTPS services. At (1.7), the controller 512 decrypts the private key and stores the private key along with the node certificate. It should be understood that when a certificate and private key set are discussed herein, the private key is the encrypted component. The certificate component does not include secret information and therefore is not typically encrypted.

Figure 6B:
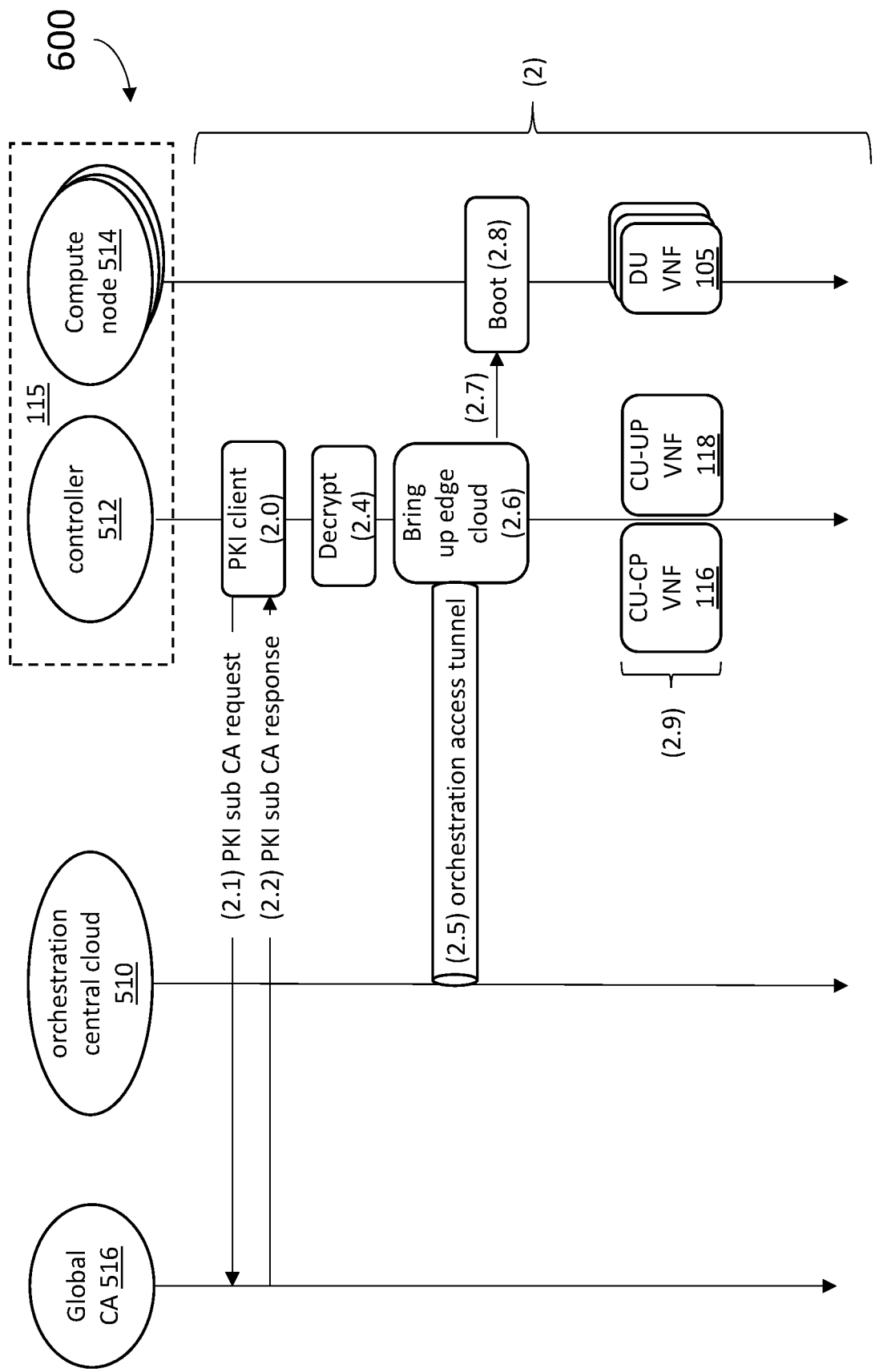

The process 600 then proceeds to FIG. 6B and segment (2) where the controller 512 node obtains the edge cloud node cluster (for example, Kubernetes cluster) sub CA certificate and private key. The sub CA certificate and private key can be either acquired from the global CA 512 or generated locally based on configuration. At (2.0), the controller 512 optionally acquires the edge cloud node cluster sub CA certificate and private key from the global CA 516 if configured so, or it triggers the edge cloud node cluster to generate the sub CA certificate and private key locally if configured to do so. At (2.1), if the controller 512 is configured, it will send a certificate and key request to acquire the edge cloud node cluster sub CA certificate and private key from the global CA 516. The edge cloud node cluster sub CA certificate and private key request uses the controller 512's FQDN as the identifier. The PKI request is signed using the controller 512's PKI signing certificate and private key and sent to the global CA 516. At (2.2), the edge cloud node sub CA certificate and private key response is received from global CA 516 comprising the encrypted edge cloud node sub CA certificate and private key. At (2.4), the controller 512 decrypts and installs the edge cloud node sub CA certificate and private key. At (2.5), the controller 512 establishes an orchestration access IPsec tunnel connecting to the orchestration central cloud 510 functions for edge cloud orchestration, setting up the IPsec tunnel, using an edge node management access certificate and private key as needed.

At (2.6), the edge cloud controller 512 is configured to implement the edge cloud master node (for example, the Kubernetes master in some implementations), which in this embodiment will host the CU-CP VNF 116 and CU-UP VNF 118. This will initiate (2.7) to configure the edge cloud compute nodes 514 to implement edge cloud 115 worker nodes 122 (for example, the Kubernetes worker nodes), which in this embodiment will host the DU VNF(s) 105, and the process 600 will proceed to (2.8) where the edge cloud compute nodes 514 are bootstrapped and booted up. At (2.9), the VNFs of the virtualized entities 126 are deployed. For example, for a gNodeB base station 100, the gNodeB CU-CP VNF 116 and CU-UP VNF 118 are deployed on the edge cloud controller 512, and a gNodeB DU VNF 105 is deployed onto each of the edge cloud compute nodes 514, with supporting VNFs deployed on the controller 512 and compute nodes 514.

Figure 6C:
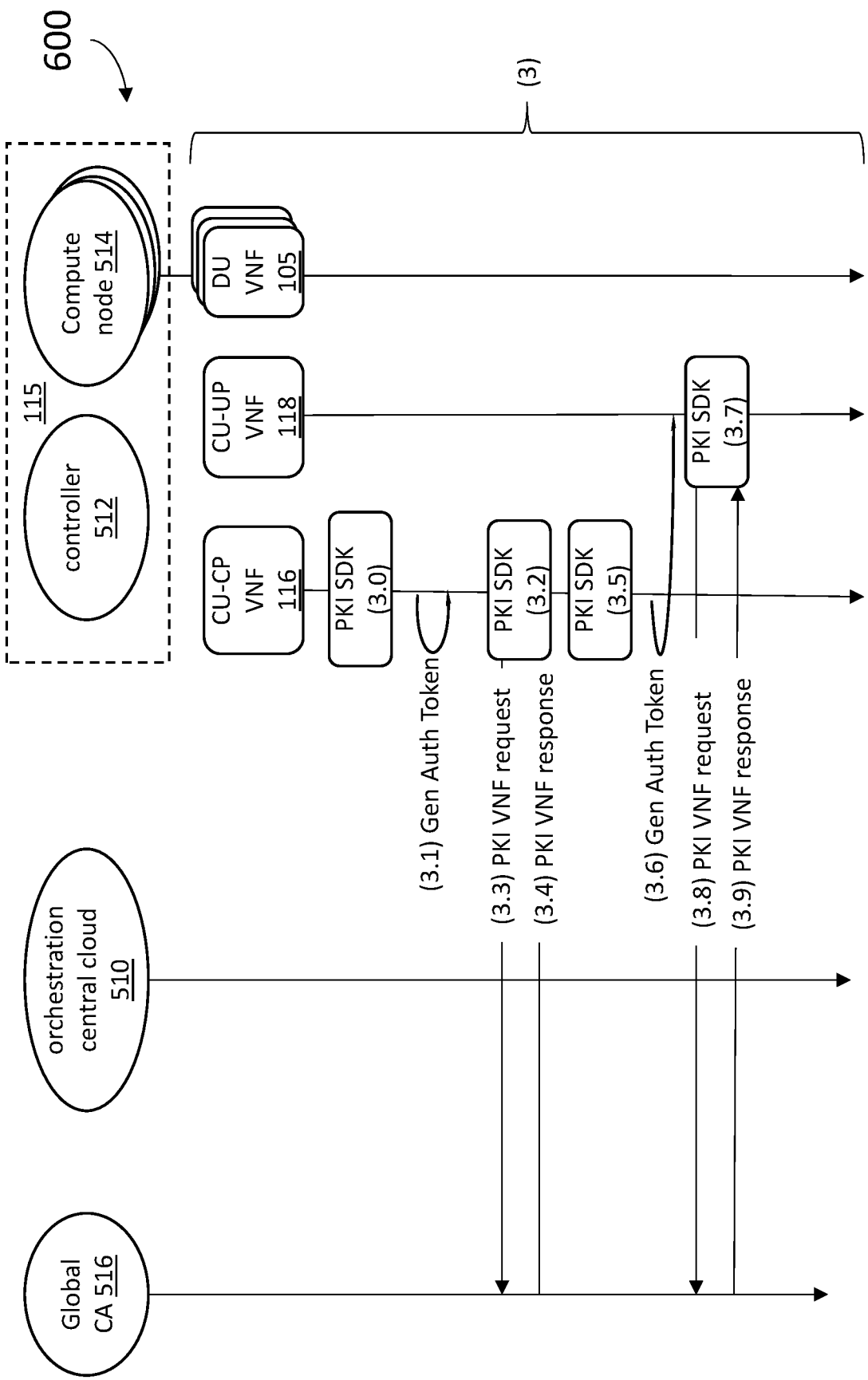
Figure 6D:
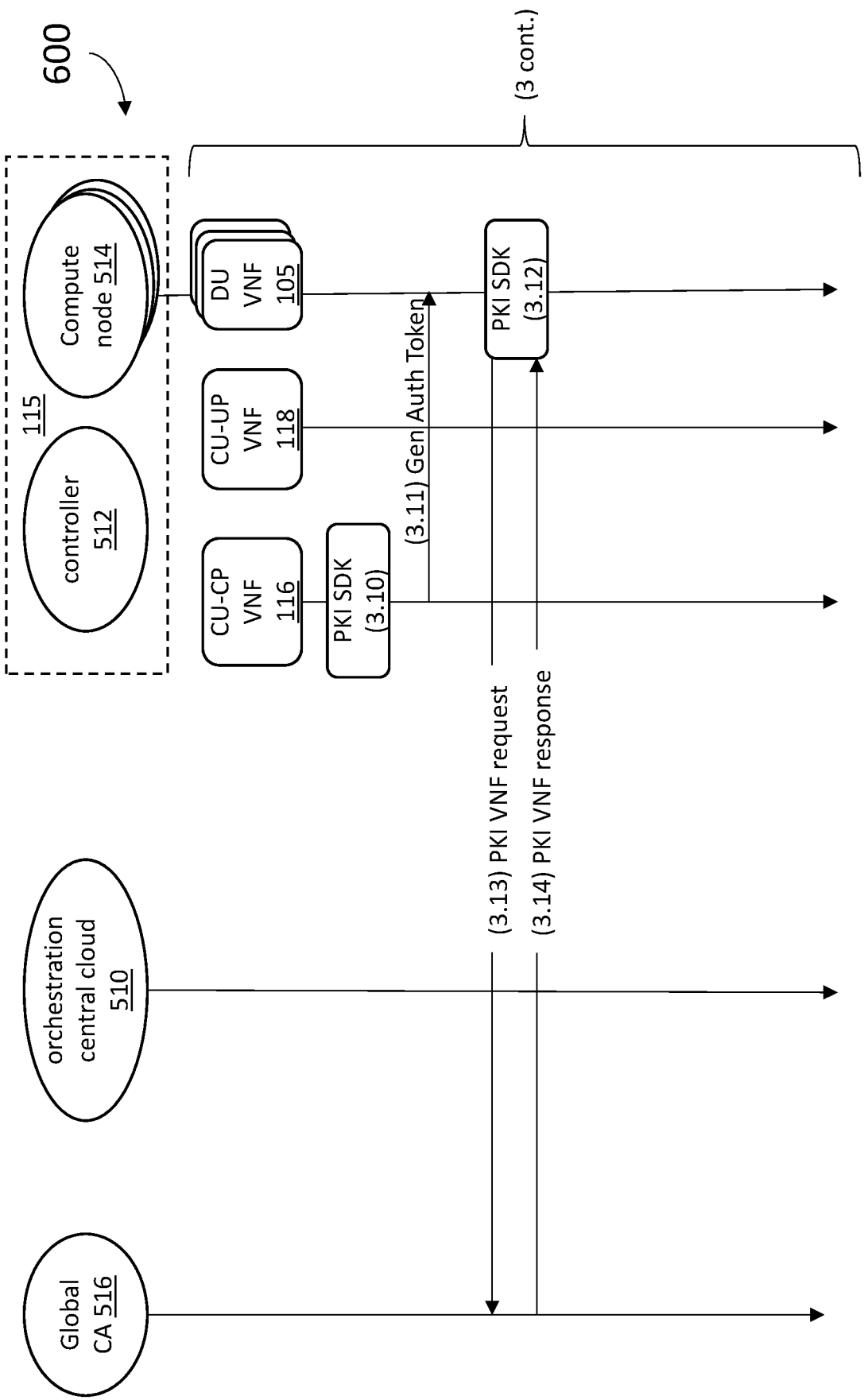

In segment (3) of process 600, shown in FIGS. 6C and 6D, the VNFs (for example, CU-CP VNF 116, CU-UP VNF 118 and DU VNF 105) are now up and running, and the procedure proceeds with obtaining certificates and keys for these VNFs. At (3.0), CU-CP VNF 116 executes global CA access client library functions (for example, a PKI SDK lib) to generate an authorization token using a timestamp and a CU-CP VNF-ID, the authorization token is signed using the PKI signing certificate and private key. At (3.1), the authorization token is sent by the CU-CP VNF 116 to itself via a VNF certificate and private key update request. At (3.2), the global CA access client library functions in the edge cloud controller 512 (for example, a PKI SDK lib) issue the VNF certificate and private key request comprising the authorization token and the CU-CP VNF-ID, and signs the VNF certificate and private key request using the obfuscated global certificate and private key within the library. At (3.3), the VNF certificate and private key request is sent to the global CA 516 and at (3.4) the global CA 516 sends back to the CU-CP VNF 116 a VNF certificate and private key response with an encrypted VNF certificate and private key along with the certificate. This VNF private key is decrypted and stored along with the certificate.

Similar procedures are executed for acquiring the VNF certificate and private key for CU-UP VNF 118. At (3.5), CU-UP VNF 118 executes global CA access client library functions (for example, a PKI SDK lib) to generate an authorization token using a timestamp and a CU-UP VNF-ID, the authorization token is signed using the PKI signing certificate and private key. At (3.6), the authorization token is sent to the CU-UP VNF 118 via a VNF certificate and private key update request. At (3.7), the global CA access client library functions in the edge cloud controller 6512 (for example, a PKI SDK lib) issue the VNF certificate and private key request comprising the authorization token and the CU-UP VNF-ID, and signs the VNF certificate and private key request using the obfuscated global certificate and private key within the library. At (3.8), the VNF certificate and private key request is sent to the global CA 516 and at (3.9) the global CA 516 sends back to the CU-UP VNF 118 a VNF certificate and private key response with an encrypted VNF private key along with the certificate.

For acquiring the VNF certificate and private key for each of the one or more DU VNF 105, a similar process is again executed as shown in FIG. 6D. At (3.10), controller 512 executes global CA access client library functions (for example, a PKI SDK lib) to generate an authorization token using a timestamp and a DU VNF-ID, the authorization token is signed using the PKI signing certificate and private key. At (3.11), the authorization token is sent by the controller 512 to the DU VNF 102 via a VNF certificate and private key update request. At (3.12), a global CA access client library function in the edge cloud compute node 514 (for example, a PKI SDK lib) issues the VNF certificate and private key request comprising the authorization token and the DU VNF-ID, and signs the VNF certificate and private key request using the obfuscated global certificate and private key within the library. At (3.13), the VNF certificate and private key request is sent to the global CA 516 and at (3.14) the global CA 516 sends back to the DU VNF 105 a VNF certificate and private key response with an encrypted VNF private key, along with the certificate.

Figure 6E:
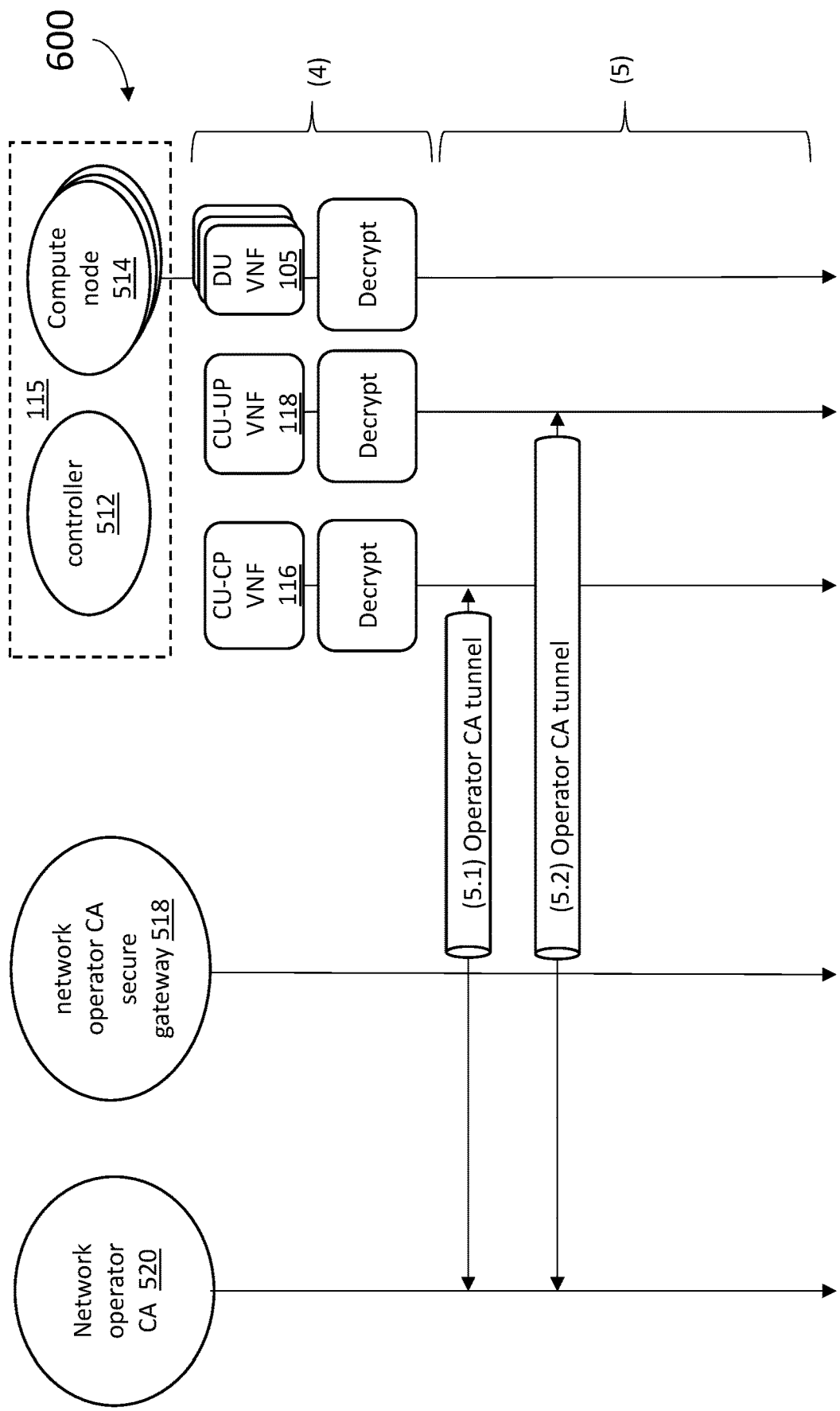

The process 600 then proceeds to segment (4) in FIG. 6E where the CU-CP VNF 116, the CU-UP-VNF 118 and the DU 105 each decrypt (the VNF private key) and store the respective VNF certificate and private key they received from the global CA 516. For implementations where there is no network operator CA 520, then the decrypted VNF certificates and keys may be used to establish the X2 IPsec tunnel 350 and S1/X1 IPsec tunnel 252 with the operator network 260.

For implementations where there is a network operator CA 520, the process 600 proceeds to segment (5) where the S1/X2 IPsec tunnel certificates and keys are obtained from the network operator CA 520. At (5.1), the CU-CP VNF 116 establishes an IPsec tunnel to the operator CA secure gateway 522 and acquires the X2-C IPsec certificate and private key from the operator CA 520. In some embodiments, CMPv2 protocol can be used for acquiring the X2-C IPsec certificate and private key. At (5.2), the CU-UP VNF 118 establishes an IPsec tunnel (for example, tunnel 252) to the operator CA secure gateway 512 and acquires the X2-U/S1-U IPsec certificate and private key from the operator CA 520.

Figure 6F:
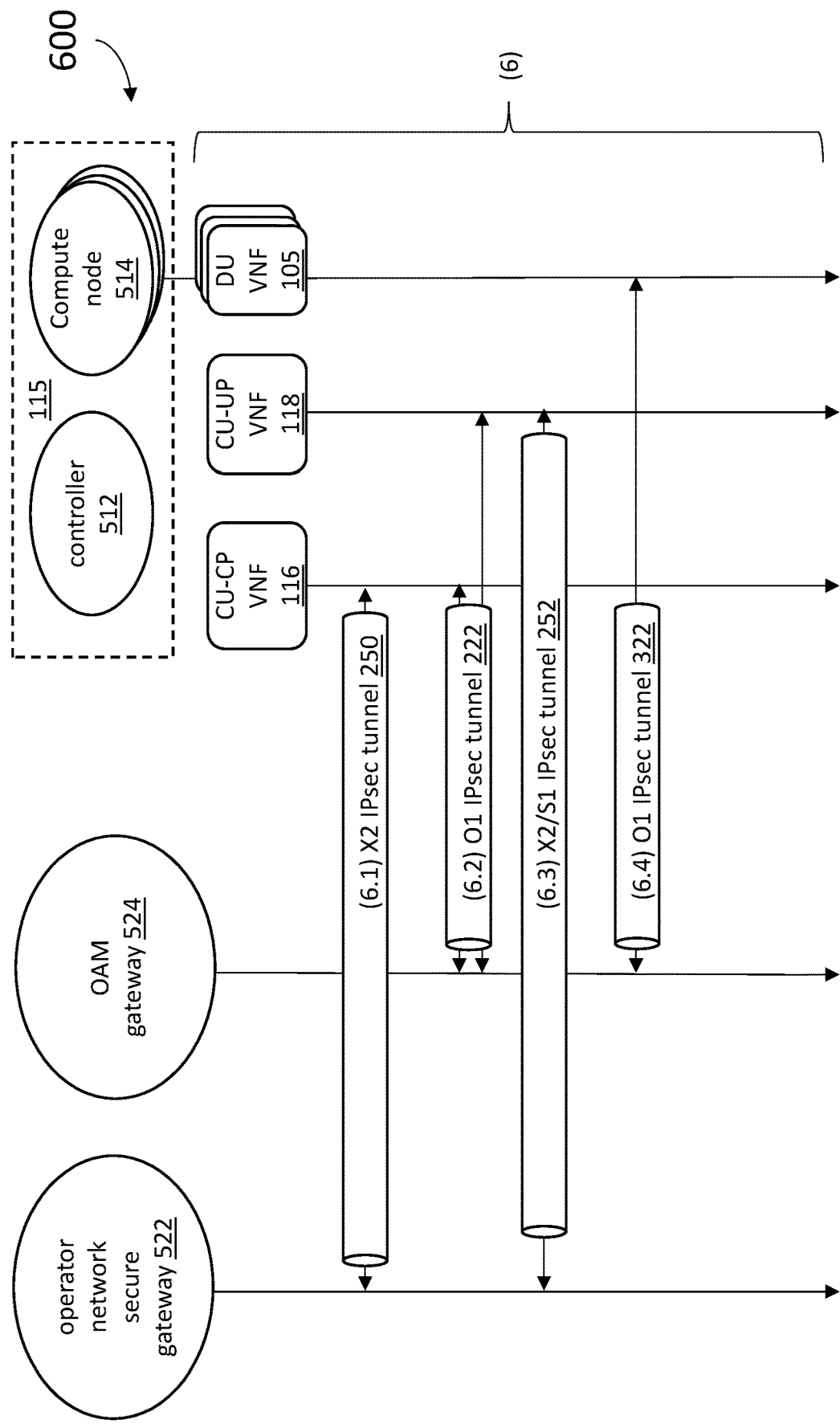

The process 600 then proceeds to FIG. 6F with segment (6) to establish the IPsec tunnels for operating the base station 100. At (6.1), the CU-CP VNF 116 establishes the X2-C IPsec tunnel 250 from the CU-CP VNF 116 to the operator network secure gateway 522 (262 in FIG. 2). At (6.2), the VGW 234 for the CU VNFs 232 establishes the O1 IPsec tunnel 222 to the secure gateway 524 (220 in FIG. 2). At (6.3), the CU-UP VNF 118 established the X2-U/S1-U IPsec tunnel 252 from the CU-UP VNF 118 to the operator network secure gateway 522 (262 in FIG. 2). At (6.4), the VGW 334 establishes the O1 IPsec tunnel 322 to the secure gateway 524 (220 in FIG. 2).

Figure 7A:
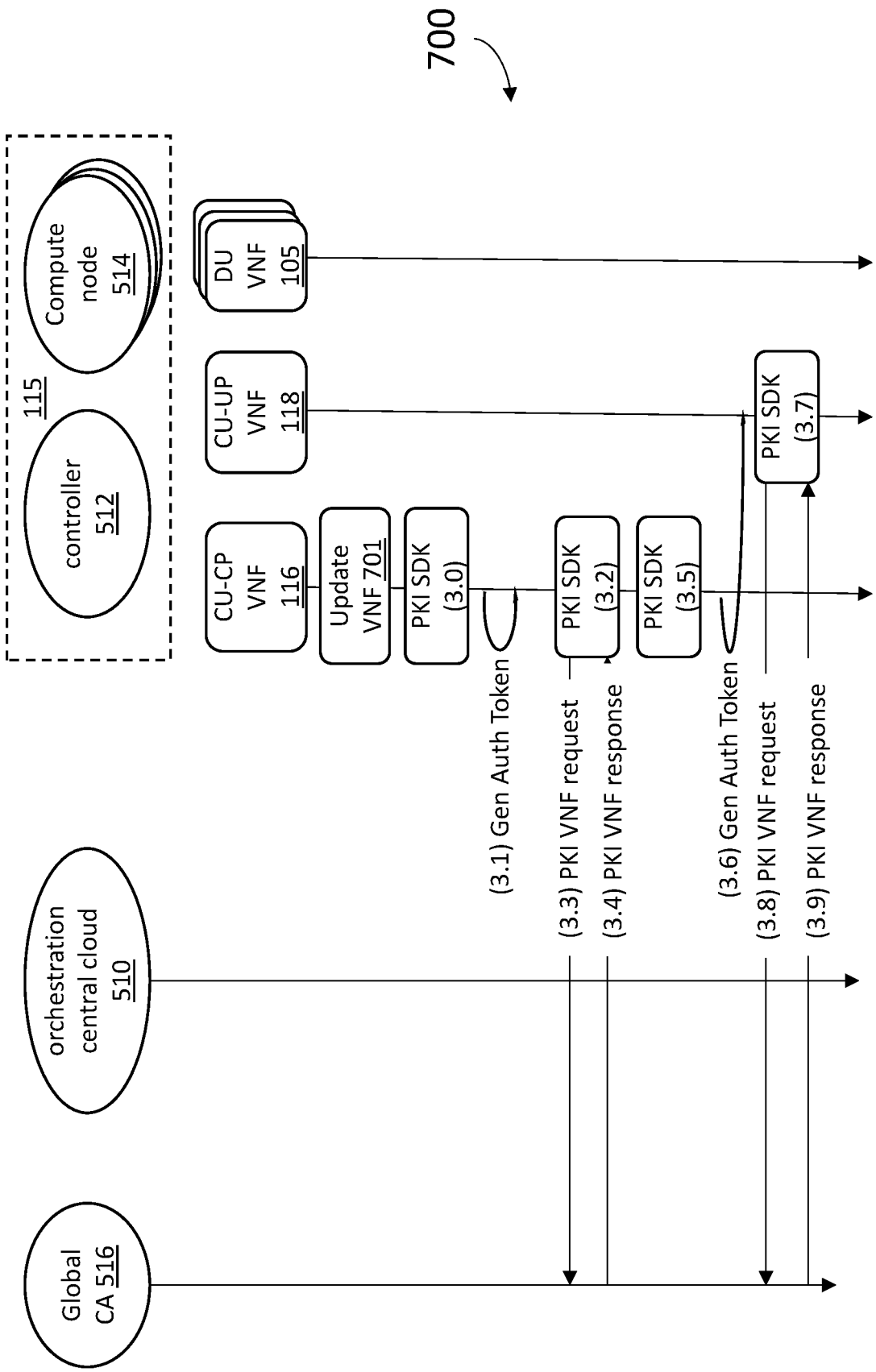
FIGS. 7A-7B illustrate a process of centralized authorization token-based VNF certificates and keys renewal.
Figure 7B:
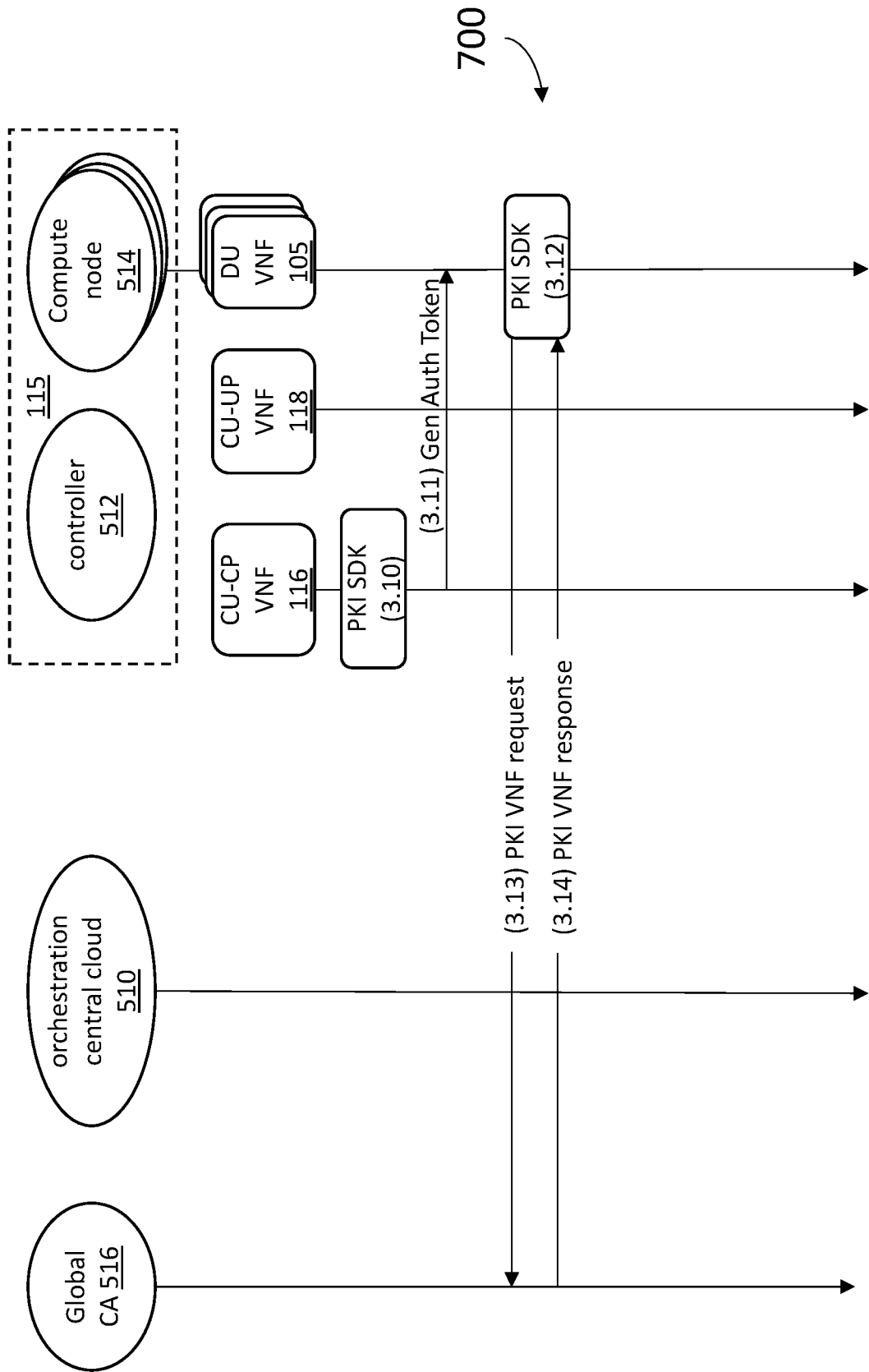

FIGS. 7A-7B illustrate a process 700 for renewing VNF certificates and keys. This process 700 essentially reperforms the segment (3) of process 600, in response to receiving an update instruction 701 to renew the VNF certificates and keys. At this point, the CU-CP VNF 116, CU-UP VNF 118 and DU VNF 105 are each up and running, and the procedure proceeds with renewing certificates and keys for these VNFs. At (3.0), CU-CP VNF 116 executes global CA access client library functions (for example, a PKI SDK lib) to generate an authorization token using a timestamp and a CU-CP VNF-ID, the authorization token signed using the PKI signing certificate and private key.

At (3.1), the authorization token is sent by the CU-CP VNF 116 to itself via a VNF certificate and private key update request. At (3.2), the global CA access client library functions in the edge cloud controller 512 (for example, a PKI SDK lib) issue the VNF certificate and private key request comprising the authorization token and the CU-CP VNF-ID, and signs the VNF certificate and private key request using the obfuscated global certificate and private key within the library. At (3.3), the VNF certificate and private key request is sent to the global CA 516 and at (3.4) the global CA 516 sends back to the CU-CP VNF 116 an updated VNF certificate and private key response with an encrypted VNF private key along with the certificate.

Similar procedures are executed for renewing the VNF certificate and private key for CU-UP VNF 118. At (3.5), CU-UP VNF 118 executes global CA access client library functions (for example, a PKI SDK lib) to generate an authorization token using a timestamp and a CU-UP VNF-ID, the authorization token signed using the PKI signing certificate and private key. At (3.6), the authorization token is sent to the CU-UP VNF 118 via a VNF certificate and private key update request. At (3.7), the global CA access client library functions in the edge cloud controller 6512 (for example, a PKI SDK lib) issue the VNF certificate and private key request comprising the authorization token and the CU-UP VNF-ID, and sign the VNF certificate and private key request using the obfuscated global certificate and private key within the library. At (3.8), the VNF certificate and private key request is sent to the global CA 516 and at (3.9) the global CA 516 sends back to the CU-UP VNF 118 an updated VNF certificate and private key response with an encrypted VNF private key along with the certificate.

For renewing the VNF certificate and private key for each of the one or more DU VNF 105, a similar process is again executed as shown in FIG. 7B. At (3.10), controller 512 executes global CA access client library functions (for example, a PKI SDK lib) to generate an authorization token using a timestamp and a DU VNF-ID, the authorization token signed using the PKI signing certificate and private key. At (3.11), the authorization token is sent by the controller 512 to the DU VNF 102 via a VNF certificate and private key update request. At (3.12), a global CA access client library function in the edge cloud compute node 514 (for example, a PKI SDK lib) issues the VNF certificate and private key request comprising the authorization token and the DU VNF-ID, and signs the VNF certificate and private key request using the obfuscated global certificate and private key within the library. At (3.13), the VNF certificate and private key request is sent to the global CA 516 and at (3.14) the global CA 516 sends back to the DU VNF 105 a renewed VNF certificate and private key response with an encrypted VNF private key along with the certificate.

Figure 8:
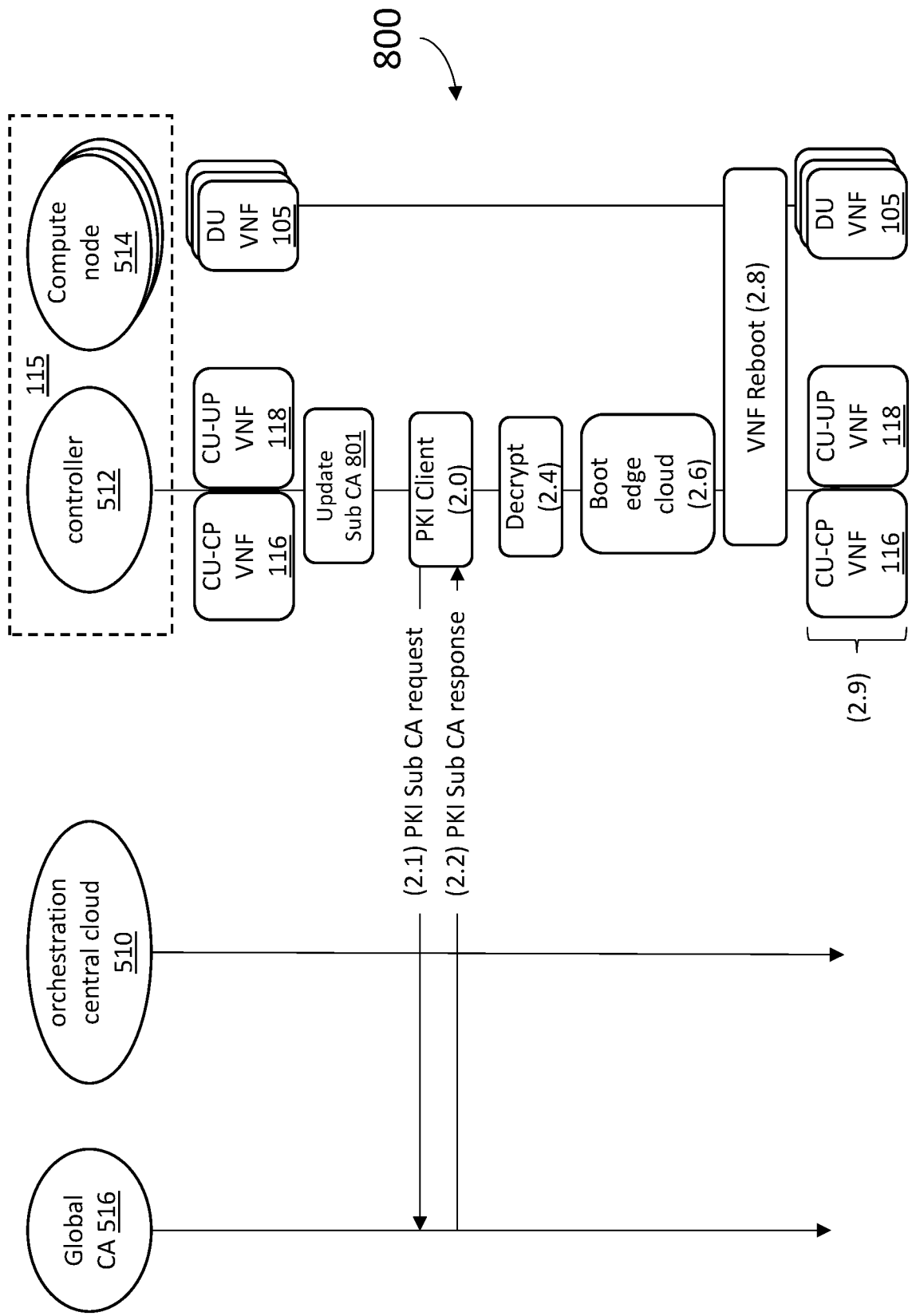
FIG. 8 illustrates a process of centralized authorization token-based edge cloud node cluster sub CA certificates and keys renewal.

FIG. 8 illustrates a process 800 for renewing edge cloud node cluster sub CA certificates and keys. This process 800 essentially reperforms the segment (2) of processes 600, in response to receiving an update sub CA instruction 801 to renew the edge cloud node cluster sub CA certificates and keys. At this point, the CU-CP VNF 116, CU-UP VNF 118 and DU VNF 105 are each up and running, and the procedure proceeds with renewing certificates and keys for the controller 512 and compute nodes 514 executing these VNFs. The controller 512 node obtains the renewed edge cloud node cluster (for example, Kubernetes cluster) sub CA certificate and private key. The sub CA certificate and private key can be either acquired from the global CA 516 or generated locally based on configuration as follows.

At (2.0), the controller 512 optionally acquires the edge cloud node cluster sub CA certificate and private key from the global CA 516 if configured so, or it triggers the edge cloud node cluster to generate the sub CA certificate and private key locally if configured to do so. At (2.1), if the controller 512 is configured, it will send a PKI request to acquire the edge cloud node cluster sub CA certificate and private key from the global CA 516. The edge cloud node cluster sub CA certificate and private key request uses the controller 512's FQDN as the identifier. The PKI request is signed using the controller 512's PKI signing certificate and private key and sent to the global CA 516. At (2.2), the edge cloud node sub CA certificate and private key response is received from global CA 516 comprising the encrypted edge cloud node sub CA certificate and private key. At (2.4), the controller 512 decrypts and installs the edge cloud node sub CA certificate and private key.

At (2.6), the edge cloud controller 512 implementing the edge cloud master node (for example, the Kubernetes master in some implementations) is restarted. This will initiate (2.8) reboot of the edge cloud 115 cloud compute nodes 514 are instructed to bootup (for example, the Kubernetes worker nodes). At (2.9), the VNFs of the virtualized entities 126 on the controller 512 and compute nodes 514 (CU-CP VNF 116, CU-UP VNF 118 and DU VNF 105) restart using the renewed edge cloud node cluster sub CA certificates and keys.

Figure 9:
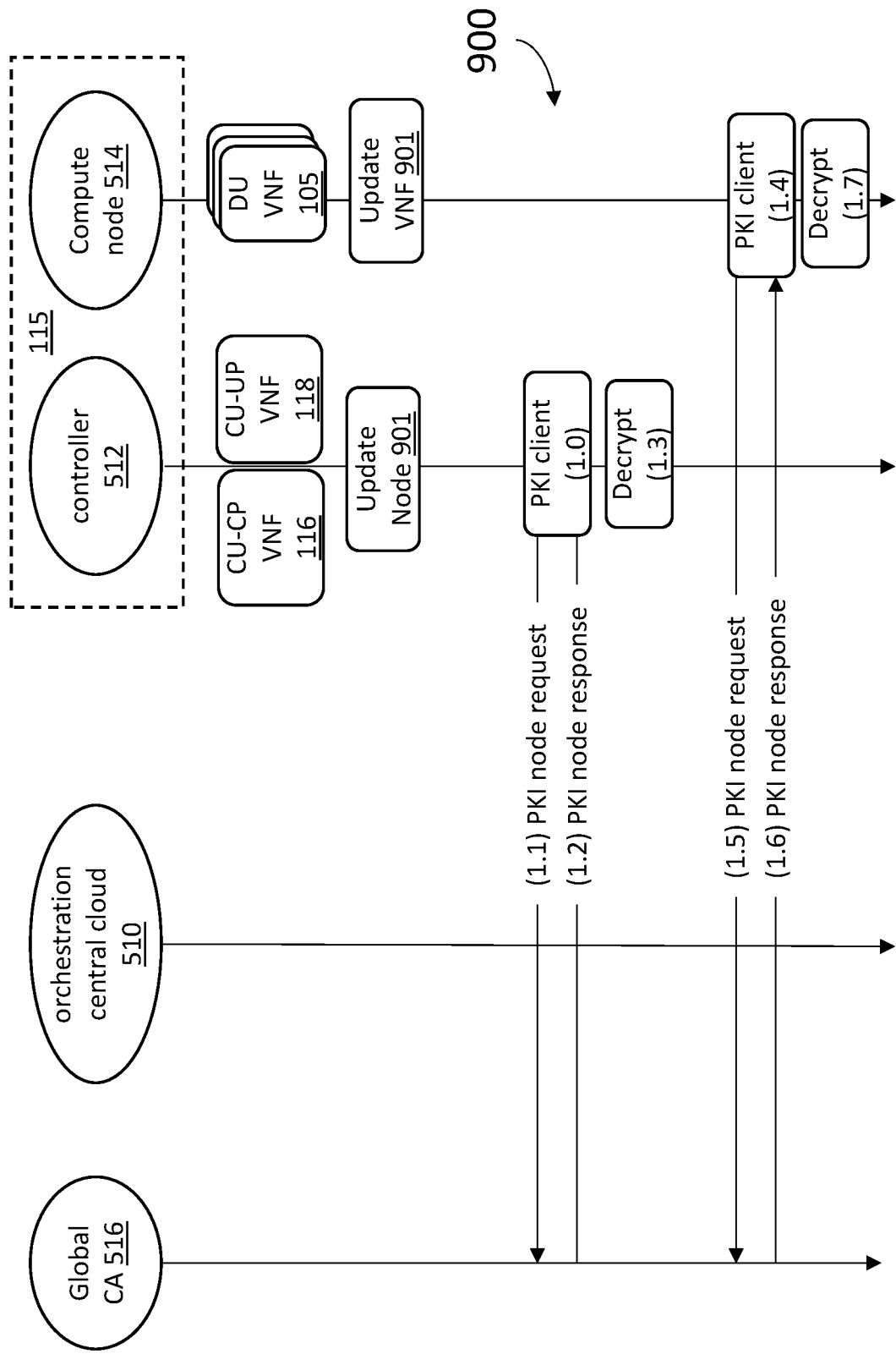
FIG. 9 illustrates a process of centralized authorization token-based node certificates and keys renewal.

FIG. 9 illustrates a process 900 for renewing node certificates and keys. This process 900 essentially reperforms the segment (1) of process 600, in response to receiving an update node instruction 901 to update the node certificates and keys. At this point, the CU-CP VNF 116, CU-UP VNF 118 and DU VNF 105 are each up and running. The process 900 proceeds to (1.0) where the controller 512 executes a PKI client application for acquiring the node certificate and private key from the global CA 516. This set of certificate and private key will also act as PKI signing certificate and private key to sign the subsequent certificate and private key acquisition requests. At (1.1), a digital certificate and private key request for acquiring the node certificate and private key (for example, the PKI signing certificate and private key) is sent by the controller 512 to the global CA 515. The digital certificate and private key request (1.1) uses the FQDN of the controller 512 as the certificate and private key identifier and is signed using the global certification and key within the PKI client application. At (1.2), the controller 512 receives from the global CA 516 the digital certificate and private key response comprising the encrypted node level certificate and private key. This set of digital certificate and private key may be used for all node level of security needs, for example, base station infrastructure orchestration, PKI request signing, OAM/O1 IPsec tunnels, and Kafka & Nginx services. At (1.3), the controller 512 decrypts and stores the updated node certificate and private key.

At (1.4), similar procedures are executed for renewing the node certificate and private key on each of the compute nodes 514 in response to receiving the update instruction 901 to update the node certificates and keys. At (1.5), a digital certificate and private key request for acquiring the node certificate and private key is sent by a compute node 514 to the global CA 515. The digital certificate and private key request (1.5) uses the FQDN of the compute node 514 as the certificate and private key identifier and is signed using the global certification and key within the PKI client application. At (1.6), the compute node 514 receives from the global CA 516 the digital certificate and private key response comprising the encrypted node level certificate and private key. This set of certificate and private key may be used for all node level of security needs, for example, base station infrastructure orchestration, PKI request signing, OAM/O1 IPsec tunnels, and Kafka & Nginx services. At (1.7), the controller 512 decrypts and stores the updated node certificate and private key.

In contrast to the centralized authorization token-based certificates and keys acquisition discussed above, embodiments that provide for distributed signing key-based certificates and keys acquisition will now be discussed. In distributed embodiments, each node within the edge cloud 115 acquires their respective set of node certificate and private key separately. The received set of node certificate and private key serves multiple purposes for that node: for accessing the orchestration central cloud 510 orchestration functions, acting as the signing key of all other subsequent PKI requests initiated from VNFs hosted on the node, and authenticating other node level of base station functions supporting services like Nginx, Kafka and OAM IPsec. This set of node certificate and private key is also named the PKI signing certificate and private key for subsequent PKI request signing purpose. When invoking PKI procedures with the global CA 516, certificate and private key requests from VNFs hosted on the node are invoked by the initiation party locally, and all requests are to be signed using the node specific PKI signing key. The global CA 516 authenticates the requests by validating the signing key. The use of PKI signing key provides the necessary protections to the vulnerability of using the static pre-installed global key and certificate (even though they are obfuscated).

FIGS. 10A-10F illustrate a process 1000 is for the distributed signing key-based certificates and keys acquisition, referred to previously in this disclosure as the second option.

Figure 10A:
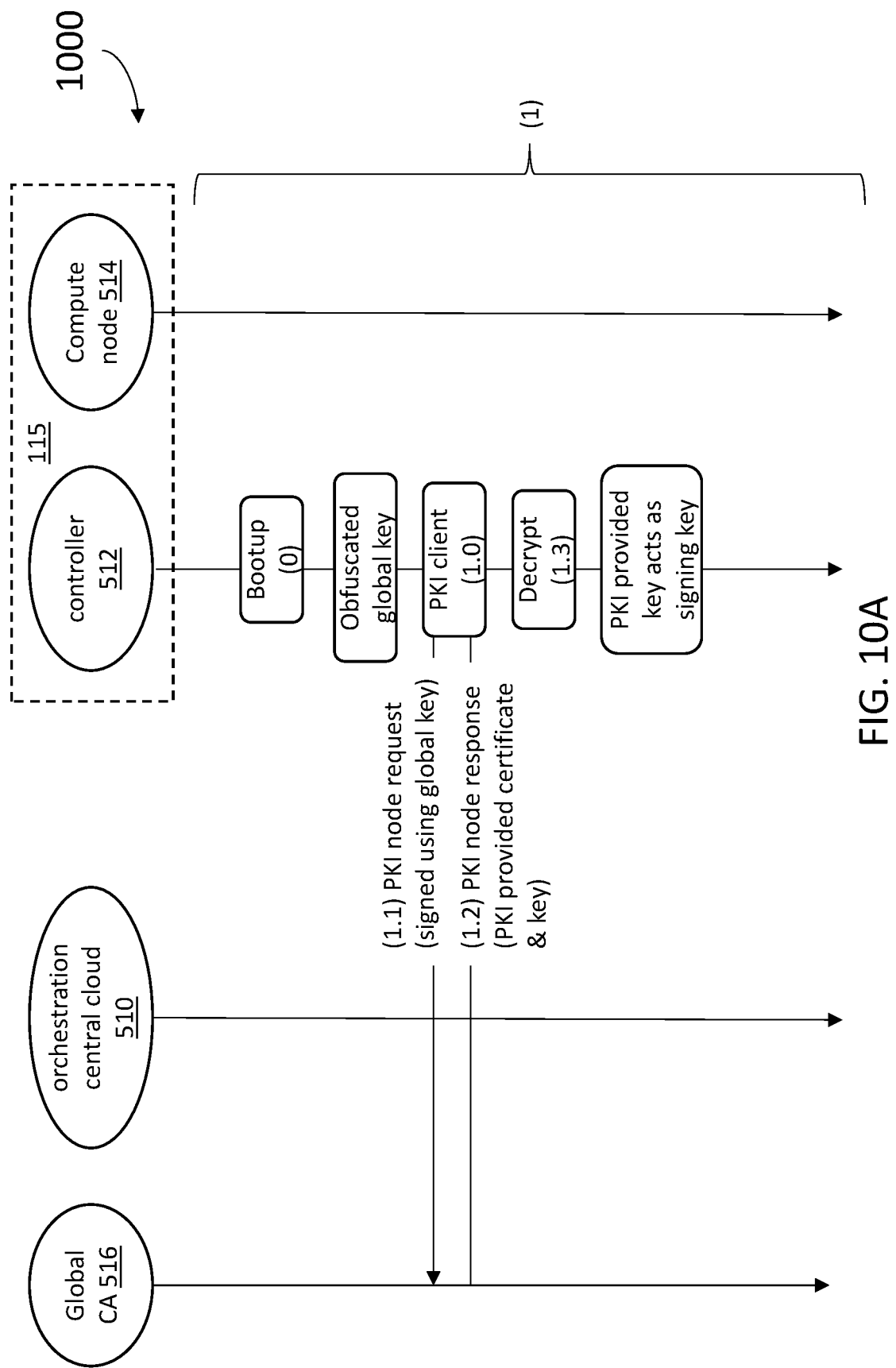
FIGS. 10A-10F illustrate an example process embodiment for distributed signing key-based certificates and keys acquisition.

Beginning with FIG. 10A, the initial bootup steps of process 1000 are illustrated. Beginning at (0), the controller 512 node in the edge cloud 115 boots up with a pre-configured fully qualified domain name (FQDN). In segment (1) of process 1000, the controller 512 node obtains a node certificate and private key. The procedure proceeds to (1.0) where the controller 512 executes a PKI client application for acquiring the node certificate and private key from the global CA 516. This set of certificate and private key will also act as PKI signing certificate and private key to sign the subsequent certificate and private key acquisition requests. At (1.1), a digital certificate and private key request for acquiring the node certificate and private key (for example, the PKI signing certificate and private key) is sent by the controller 512 to the global CA 515. The digital certificate and private key request (1.1) uses the FQDN of the controller 512 as the certificate and private key identifier and is signed using the global certification and key obfuscated within the PKI client application. At (1.2), the controller 512 receives from the global CA 516 the digital certificate and private key response comprising the encrypted node level certificate and private key. This set of digital certificate and private key may be used for all node level of security needs, for example, base station infrastructure orchestration, PKI request signing, OAM/O1 IPsec tunnels, and Kafka & Nginx services. At (1.3), the controller 512 decrypts and stores the node private key, along with the certificate.

Figure 10B:
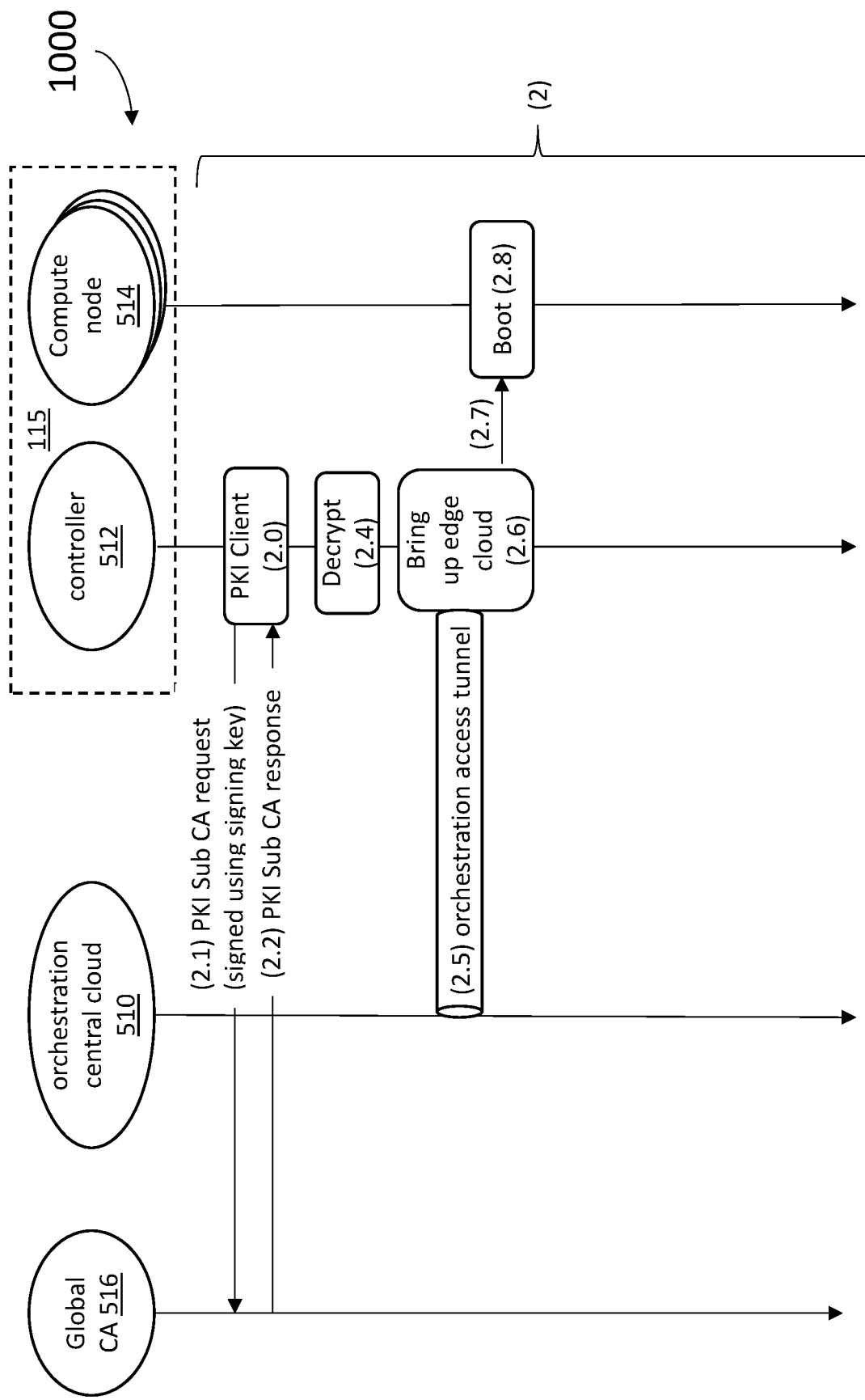

The process 1000 then proceeds to FIG. 10B and segment (2) where the controller 512 node obtains the edge cloud node cluster (for example, Kubernetes cluster) sub CA certificate and private key. The sub CA certificate and private key can be either acquired from the global CA 512 or generated locally based on configuration. At (2.0), the controller 512 optionally acquires the edge cloud node cluster sub CA certificate and private key from the global CA 516 if configured so, or it triggers the edge cloud node cluster to generate the sub CA certificate and private key locally if configured to do so (or it triggers the Kubernetes to generate the sub CA certificate and private key locally if configured to do so).

At (2.1), if the controller 512 is configured, it will send a certificate and private key request to acquire the edge cloud node cluster sub CA certificate and private key from the global CA 516. The edge cloud node cluster sub CA certificate and private key request uses the controller 512's FQDN as the identifier. The PKI request is signed using the controller 512's PKI signing certificate and private key and sent to the global CA 516. At (2.2), the edge cloud node sub CA certificate and private key response is received from global CA 516 comprising the encrypted edge cloud node sub CA certificate and private key. At (2.4), the controller 512 decrypts and installs the edge cloud node sub CA certificate and private key. At (2.5), the controller 512 establishes an orchestration access IPsec tunnel connecting to the orchestration central cloud 510 functions for edge cloud orchestration, setting up the IPsec tunnel, using an edge node management access certificate and private key as needed.

At (2.6), the edge cloud controller 512 is configured to implement the edge cloud master node (for example, the Kubernetes master in some implementations), which in this embodiment will host the CU-CP VNF 116 and CU-UP VNF 118. This will initiate (2.7) to configure the edge cloud compute nodes 514 to implement edge cloud 115 worker nodes 122 (for example, the Kubernetes worker nodes), which in this embodiment will host the DU VNF(s) 105, and the process 1000 will proceed to (2.8) where the edge cloud compute nodes 514 are bootstrapped and booted up.

Figure 10C:
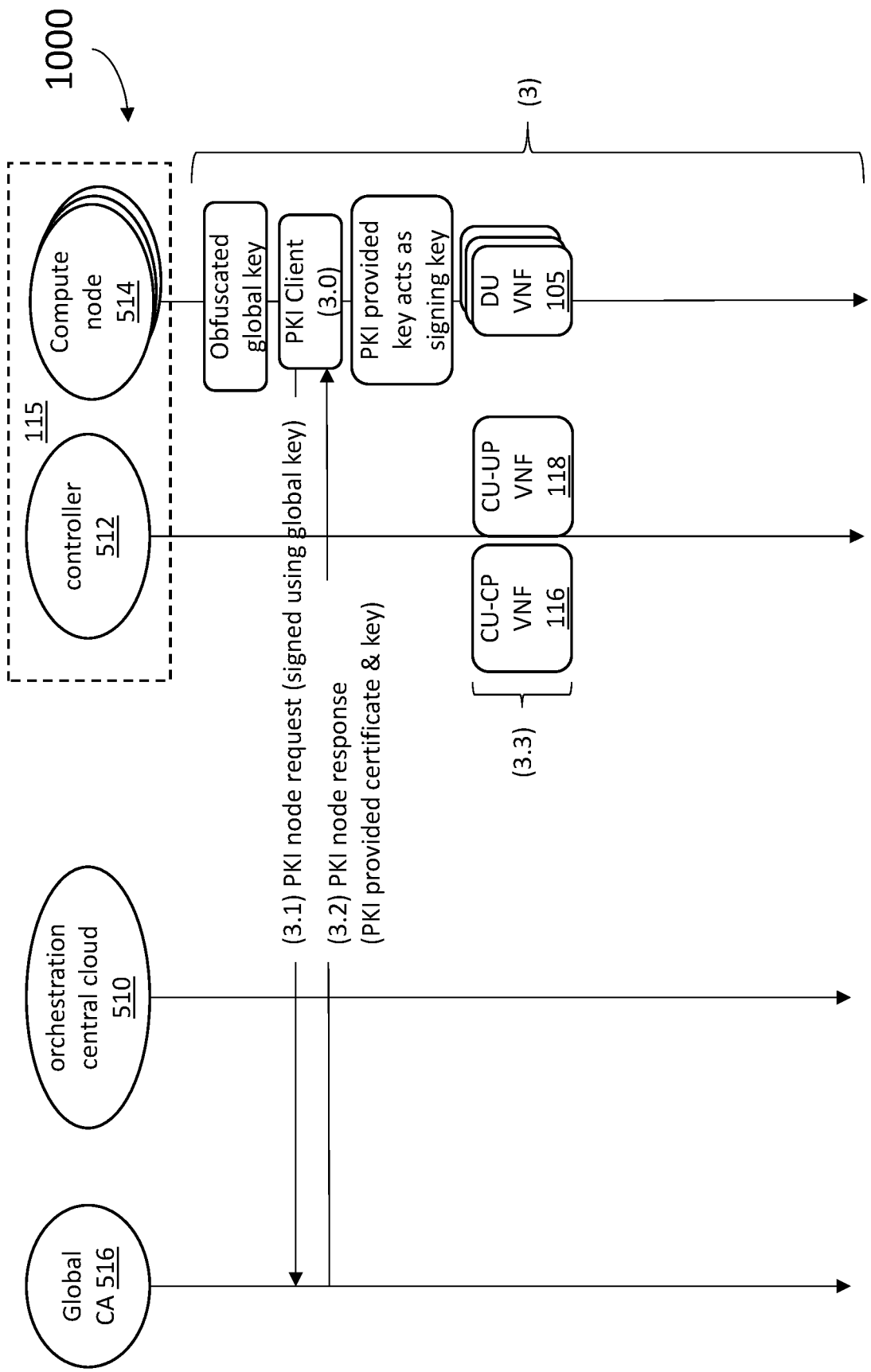

In segment (3) of process 1000, shown in FIG. 10C, the compute node(s) 514 to get the edge node management access certificate and private key. At (3.0), the compute node(s) 514 run an global CA access client application (for example, a PKI client application) for acquiring the node certificate and private key from the Global CA 516. This set of certificate and private key will also act as PKI signing certificate and private key to sign the subsequent certificate and private key acquisition requests. At (3.1), a certificate and private key request for acquiring the node certificate and private key (for example, the PKI signing certificate and private key) is sent to global CA 516. The request uses the FQDN of the requesting compute node 514 as the certificate and private key identifier and it is signed using the obfuscated global certificate and private key within the Global CA access client application. At (3.2), the digital certificate and private key response comprising the encrypted node certificate and private key received from global CA 516. The usage of this set of certificate/key is for all node level of security needs, for example, PKI request signing, OAM/O1 IPsec & Nginx. At (3.3), the VNFs of the virtualized entities 126 are deployed. For example, for a gNodeB base station 100, the gNodeB CU-CP VNF 116 and CU-UP VNF 118 are deployed on the edge cloud controller 512, and a gNodeB DU VNF 105 is deployed onto each of the edge cloud compute nodes 514, with supporting VNFs deployed on the controller 512 and compute nodes 514.

Figure 10D:
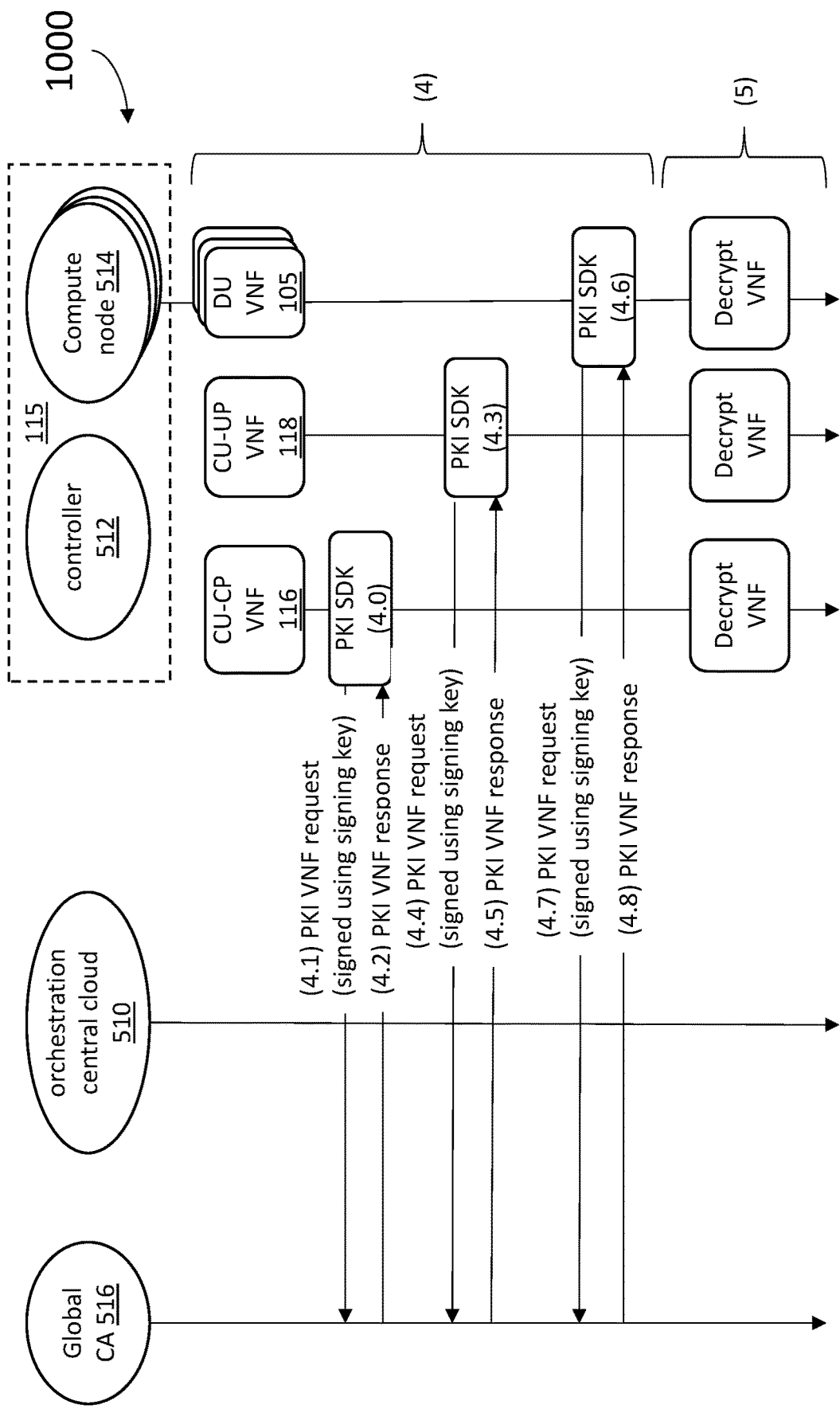

The process 1000 then proceeds to segment (4) in FIG. 10D where the CU-CP VNF 116, the CU-UP-VNF 118 and the DU 105 each receive, decrypt (the VNF private key) and store the respective VNF certificate and private key they received from the global CA 516. For implementations where there is no network operator CA 520, then the decrypted VNF certificates and keys may be used to establish the X2 IPsec tunnel 350 and S1/X1 IPsec tunnel 252 with the operator network 260. At (4.0), the CU-CP VNF 116 executes the Global CA access client library functions (also referred to as the PKI SDK lib). At (4.1), the global CA access client library functions issues a VNF certificate and private key request comprising a CU-CP VNF-ID to the global CA 516 and signs the request using the local PKI signing certificate and private key. At (4.2), the CU-CP VNF 116 receives the VNF certificate and private key response with an encrypted certificate and private key. The CU-CP VNF certificate and private key can be used for Operator CA IPsec/X2-C IPsec, Fluentd and F1-C IPsec usage.

A similar process is executed to acquire the VNF certificate and private key for CU-UP VNF 118 on the CU node. At (4.3), the CU-UP VNF 118 executes the Global CA access client library functions (also refer to as the PKI SDK lib). At (4.4), the global CA access client library functions issues a VNF certificate and private key request comprising a CU-UP VNF-ID to the global CA 516 and signs the request using the local PKI signing certificate and private key. At (4.4), the CU-CP VNF 116 receives the VNF certificate and private key response with an encrypted private key along with the certificate. The CU-CP VNF certificate and private key can be used for Operator CA IPsec/X2-C IPsec, Fluentd and F1-C IPsec usage.

A similar process is executed to acquire the VNF certificate and private key for DU VNF 105 on the CU node. At (4.6), the CU-UP VNF 118 executes the Global CA access client library functions (also referred to as the PKI SDK lib). At (4.7), the global CA access client library functions issues a VNF certificate and private key request comprising a CU-UP VNF-ID to the global CA 516 and signs the request using the local PKI signing certificate and private key. At (4.8), the CU-CP VNF 116 receives the VNF certificate and private key response with an encrypted private key along with the certificate. The CU-CP VNF certificate and private key can be used for Operator CA IPsec/X2-C IPsec, Fluentd and F1-C IPsec usage.

The process 1000 then proceeds to segment (5) in FIG. 10D where the CU-CP VNF 116, the CU-UP-VNF 118 and the DU 105 each decrypt (the VNF private key) and store the respective VNF certificate and private key they received from the global CA 516. For implementations where there is no network operator CA 520, then the decrypted VNF certificates and keys may be used to establish the X2 IPsec tunnel 350 and S1/X1 IPsec tunnel 252 with the operator network 260.

Figure 10E:
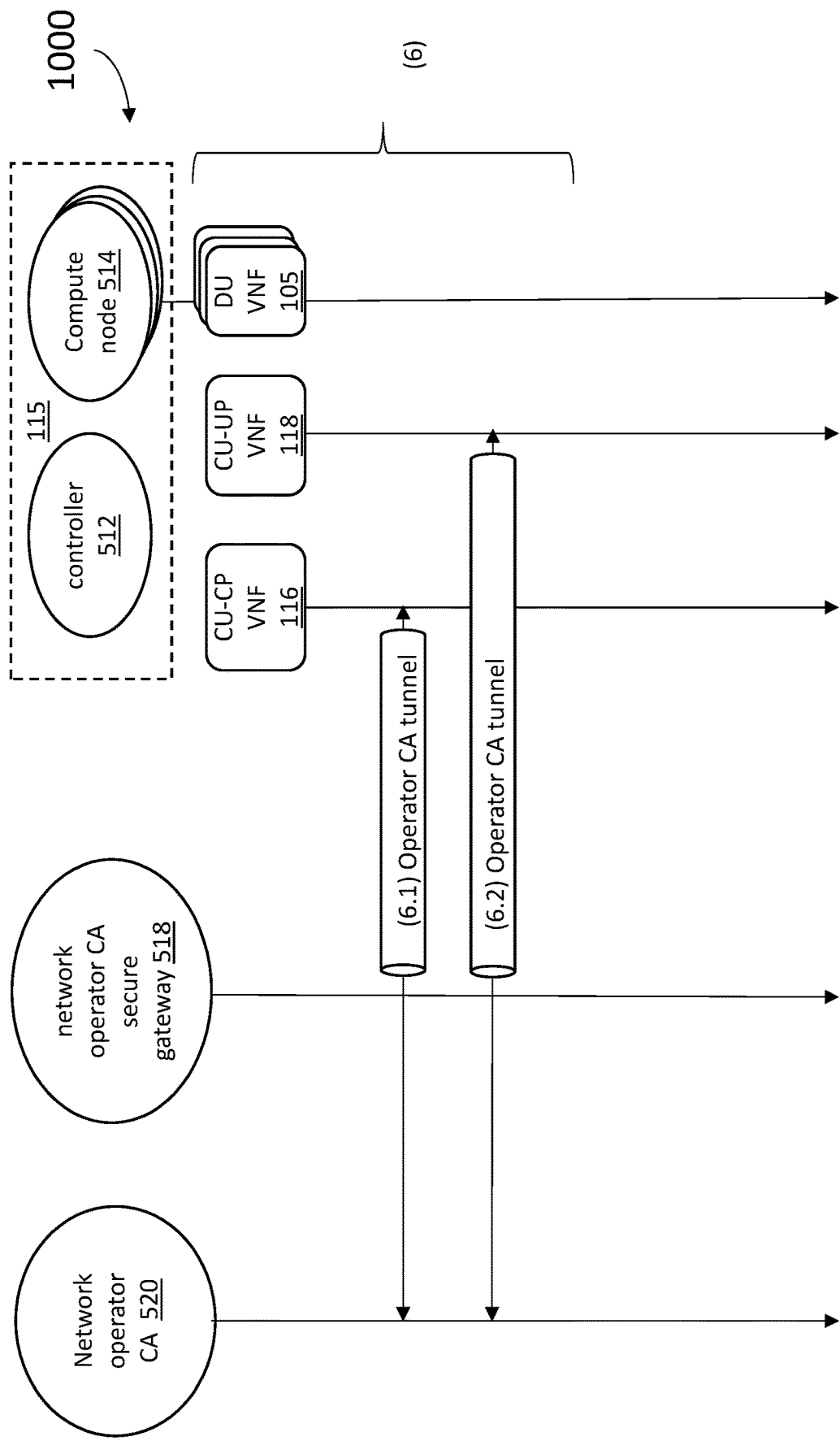

The process 1000 then proceeds to FIG. 10E with segment (6) to get S1/X2 IPsec tunnels certs/keys from the operator CA 520. If the operator CA 520 is not available, the VNF certificates and keys acquired may be used instead to establish the S1/X2 IPsec tunnels directly. At (6.1), the CU-CP VNF 116 establishes the X2-C IPsec tunnel 250 from the CU-CP VNF 116 to the operator network secure gateway 522 (262 in FIG. 2) and acquires the X2-C IPsec certificate and private key from the operator CA 520. The CMPv2 protocol can be used for acquiring the X2-C IPsec certificate and private key. At (6.2), the CU-UP VNF 118 establishes IPsec tunnel 252 from CU-UP VNF 118 to the operator CA SecGW 262 and acquires the X2-U/S1-U IPsec certificate and private key from the operator CA 502. The CMPv2 protocol can be used for acquiring the X2-U/S1-U IPsec certificate and private key.

Figure 10F:
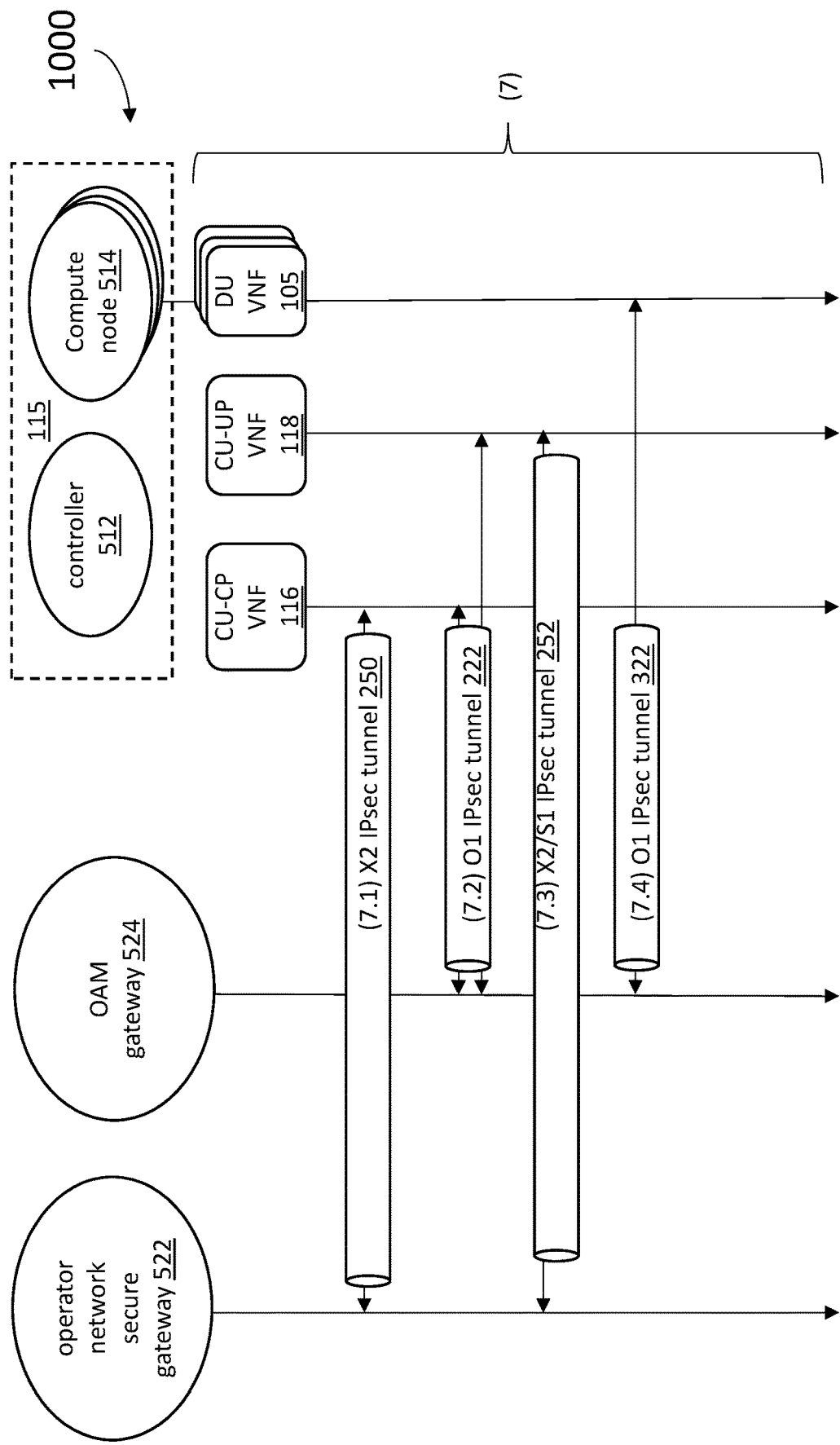

The process 1000 then proceeds to FIG. 10F with segment (7) to establish S1, X2 and O1 IPsec tunnels to the VNFs. At (7.1), the CU-CP VNF 116 establishes the X2-C IPsec tunnel 250 from the CU-CP VNF 116 to the operator network secure gateway 522 (262 in FIG. 2). At (7.2), the VGW 234 for the CU VNFs 232 establishes the O1 IPsec tunnel 222 to the OAM secure gateway 524 (220 in FIG. 2). At (7.3), the CU-UP VNF 118 establishes the X2-U/S1-U IPsec tunnel 252 from the CU-UP VNF 118 to the operator network secure gateway 522 (262 in FIG. 2). At (7.4), the VGW 334 establishes the O1 IPsec tunnel 322 to the OAM secure gateway 524 (220 in FIG. 2).

Figure 11:
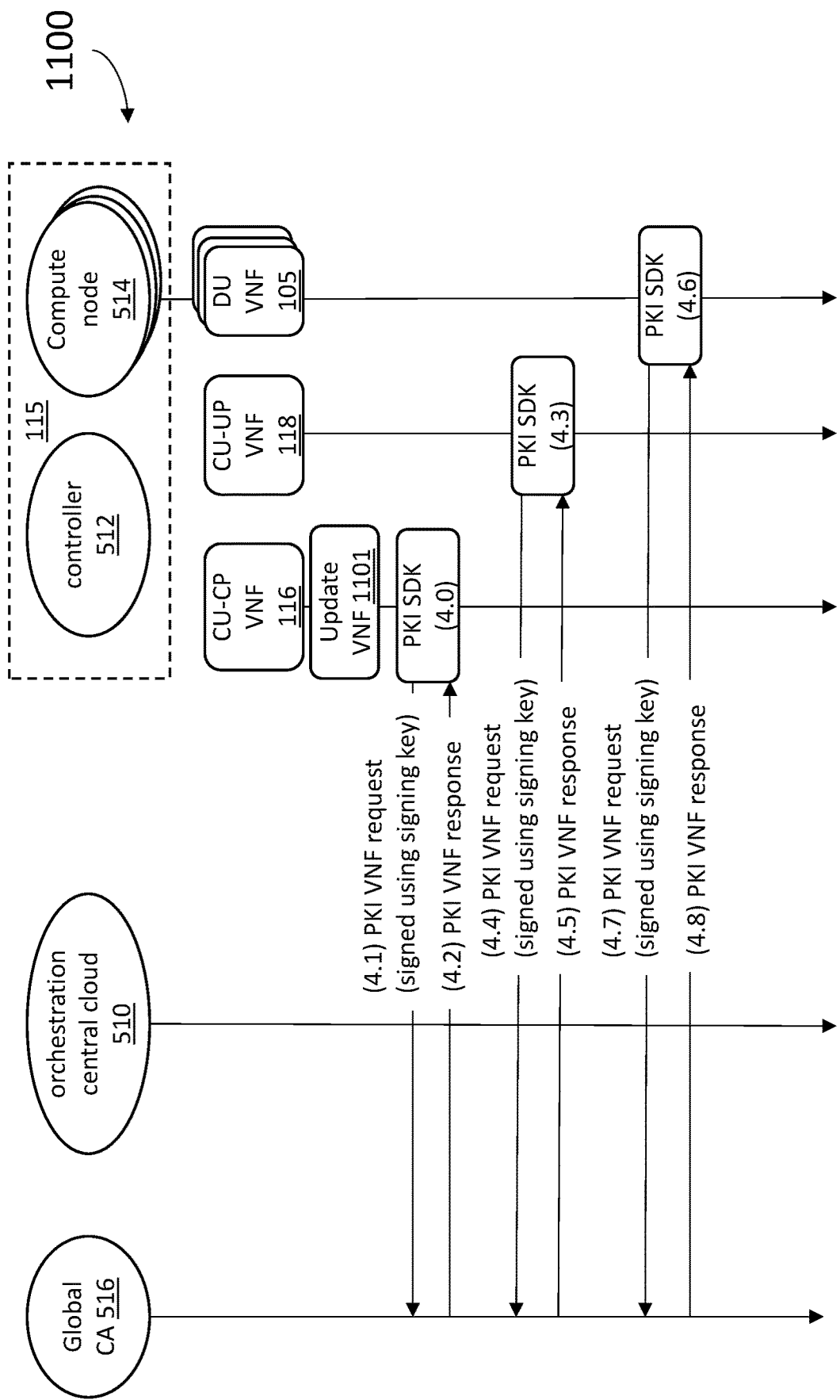
FIG. 11 illustrates a process of distributed signing key-based VNF certificates and keys renewal.

FIG. 11 illustrates a process 1100 for renewing VNF certificates and keys. This process 1100 essentially reperforms the segment (4) of processes 1100, in response to receiving an update instruction 1101 to update the VNF certificates and keys.

At (4.0), the CU-CP VNF 116 executes the Global CA access client library functions (also referred to as the PKI SDK lib). At (4.1), the global CA access client library functions issues a VNF certificate and private key request comprising a CU-CP VNF-ID to the global CA 516 and signs the request using the local PKI signing certificate and private key. At (4.2), the CU-CP VNF 116 receives the VNF certificate and private key response with an encrypted private key along with the certificate. The renewed CU-CP VNF certificate and private key can be used for Operator CA IPsec/X2-C IPsec, Fluentd and F1-C IPsec usage.

A similar process is executed to acquire the VNF certificate and private key for CU-UP VNF 118 on the CU node. At (4.3), the CU-UP VNF 118 executes the Global CA access client library functions (also referred to as the PKI SDK lib). At (4.4), the global CA access client library functions issues a VNF certificate and private key request comprising a CU-UP VNF-ID to the global CA 516 and signs the request using the local PKI signing certificate and private key. At (4.4), the CU-UP VNF 118 receives the VNF certificate and private key response with an encrypted private key along with the certificate. The renewed CU-UP VNF certificate and private key can be used for Operator CA IPsec/X2-U/S1-U IPsec, Fluentd and F1-U IPsec usage.

A similar process is executed to acquire the VNF certificate and private key for DU VNF 105 on the DU node. At (4.6), the DU VNF 105 executes the Global CA access client library functions (also referred as the PKI SDK lib). At (4.7), the global CA access client library functions issues a VNF certificate and private key request comprising a DU VNF-ID to the global CA 516 and signs the request using the local PKI signing certificate and private key. At (4.8), the DU VNF 105 receives the VNF certificate and private key response with an encrypted private key along with the certificate. The renewed DU VNF certificate and private key can be used for Fluentd and F1-C/U IPsec usage.

Figure 12:
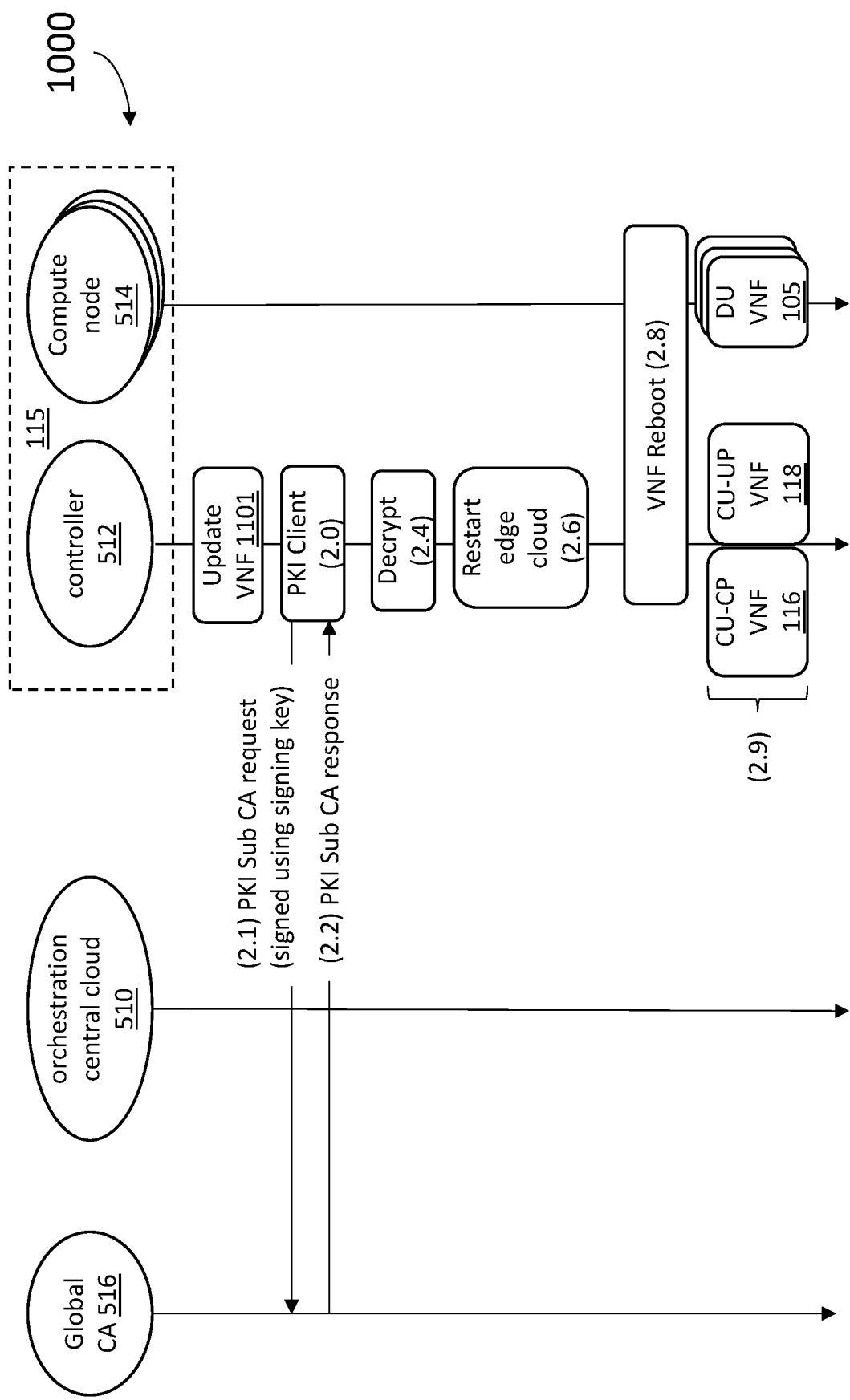
FIG. 12 illustrates a process of distributed signing key-based edge cloud node cluster sub CA certificates and keys renewal.

FIG. 12 illustrates a process 1200 for renewing edge cloud node cluster sub CA certificates and keys. This process 1200 essentially reperforms the segment (2) of processes 1000, in response to receiving an update instruction 1201 to renew the edge cloud node cluster sub CA certificates and keys. The renewed sub CA certificate and private key can be either acquired from the global CA 512 or generated locally based on configuration. At (2.0), the controller 512 optionally acquires the edge cloud node cluster sub CA certificate and private key from the global CA 516 if configured so, or it triggers the edge cloud node cluster to generate the sub CA certificate and private key locally if configured to do so (or it triggers the Kubernetes to generate the sub CA certificate and private key locally if configured to do so).

At (2.1), if the controller 512 is configured, it will send a certificate and private key request to acquire the edge cloud node cluster sub CA certificate and private key from the global CA 516. The edge cloud node cluster sub CA certificate and private key request uses the controller 512's FQDN as the identifier. The PKI request is signed using the controller 512's PKI signing certificate and private key and sent to the global CA 516. At (2.2), the edge cloud node sub CA certificate and private key response is received from global CA 516 comprising the encrypted edge cloud node sub CA certificate and private key. At (2.4), the controller 512 decrypts and installs the edge cloud node sub CA certificate and private key. At (2.6), the edge cloud controller 512 implementing the edge cloud master node (for example, the Kubernetes master in some implementations) is restarted. This will initiate (2.8) reboot of the edge cloud 115 cloud compute nodes 514 are bootstraped and booted up (for example, the Kubernetes worker nodes). At (2.9), the VNFs of the virtualized entities 126 on the controller 512 and compute nodes 514 (CU-CP VNF 116, CU-UP VNF 118 and DU VNF 105) restart using the updated edge cloud node cluster sub CA certificates and keys.

Figure 13:
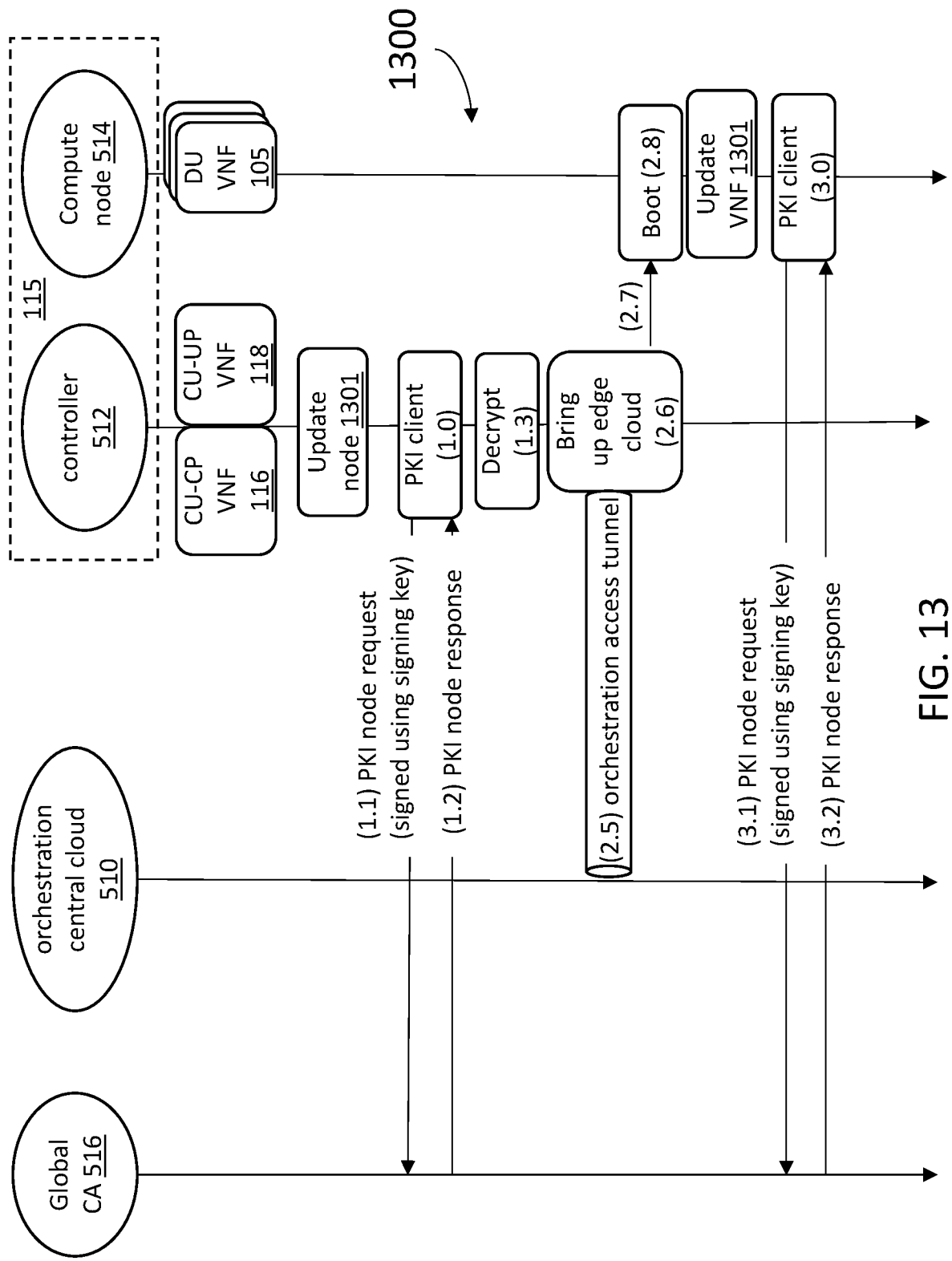
FIG. 13 illustrates a process of distributed signing key-based node certificates and keys renewal.

FIG. 13 illustrates a process 1300 for renewing node certificates and keys. This process 1300 essentially reperforms portions of segments (1), (2) and (3) of processes 1000, in response to receiving an update instruction 1301 to renew the node certificates and keys. At this point, the CU-CP VNF 116, CU-UP VNF 118 and DU VNF 105 are each up and running. The process 1300 proceeds to (1.0) where the controller 512 executes a PKI client application for acquiring the node certificate and private key from the global CA 516. This set of certificate and private key will also act as PKI signing certificate and private key to sign the subsequent certificate and private key acquisition requests. At (1.1), a node certificate and private key request for acquiring the node certificate and private key (for example, the PKI signing certificate and private key) is sent by the controller 512 to the global CA 515. The digital certificate and private key request (1.1) uses the FQDN of the controller 512 as the certificate and private key identifier and is signed using the global certification and key within the PKI client application. At (1.2), the controller 512 receives from the global CA 516 the digital certificate and private key response comprising the encrypted node level certificate and private key. This set of digital certificate and private key may be used for all node level of security needs, for example, base station infrastructure orchestration, PKI request signing, OAM/O1 IPsec tunnels, and Kafka & Nginx services. At (1.3), the controller 512 decrypts and stores the updated node private key along with the certificate.

At (2.5), the controller 512 establishes an orchestration access IPsec tunnel connecting to the orchestration central cloud 510 functions for edge cloud orchestration, setting up the IPsec tunnel, using an edge node management access certificate and private key as needed. At (2.6), the edge cloud controller 512 is configured to restart the edge cloud master node (for example, the Kubernetes master in some implementations), which in this embodiment host the CU-CP VNF 116 and CU-UP VNF 118. This will initiate (2.7) to configure the edge cloud compute nodes 514 to implement edge cloud 115 worker nodes 122 (for example, the Kubernetes worker nodes), which in this embodiment will host the DU VNF(s) 105, and the process 1300 will proceed to (2.8) where the edge cloud compute nodes 514 are instructed to bootup.

The process 1300 proceeds to (3.0) where a compute node 514 executes a PKI client application for acquiring the node certificate and private key from the global CA 516. This set of certificate and private key will also act as PKI signing certificate and private key to sign the subsequent certificate and private key acquisition requests. At (3.1), a digital certificate and private key request for acquiring the node certificate and private key (for example, the PKI signing certificate and private key) is sent by the controller 512 to the global CA 515. The digital certificate and private key request (3.1) uses the FQDN of the controller 512 as the certificate and private key identifier and is signed using the global certification and key within the PKI client application. At (3.2), the controller 512 receives from the global CA 516 the digital certificate and private key response including the encrypted node level private key along with the certificate. This set of digital certificate and private key may be used for all node level of security needs, for example, base station infrastructure orchestration, PKI request signing, OAM/O1 IPsec tunnels, and Kafka & Nginx services.

In each of the embodiments described herein, the certificates and keys acquired at node and VNF levels serve each respective levels of multiple purposes. The intention of this arrangement is to eliminate unnecessary duplication of procedures and certificates/keys. If, however, any of the functions require a dedicated set of certificates/keys, the similar procedures can be duplicated to serve the purposes.

EXAMPLE EMBODIMENTS

Example 1 includes a method for secure virtualized wireless base station orchestration on a node of a scalable cloud environment, the method comprising: obtaining a node certificate and private key from a global certificate authority (CA) using a PKI request signed using a global certification and key, wherein the node certificate and private key defines a PKI signing certificate and private key; establishing an orchestration access IPsec tunnel to an orchestration central cloud comprising one or more functions for edge cloud orchestration; utilizing, via the orchestration access IPsec tunnel, the one or more functions for edge cloud orchestration to deploy on the node one or more virtualized entities comprising one or more virtual network functions of a wireless base station; obtaining at least one virtual network function (VNF) certificate and private key for the one or more deployed VNFs from the global CA using a PKI request signed using the global certificate and private key; utilizing the at least one VNF certificate and private key, establishing one or more IPsec tunnels comprising at least one of: at least one X2 IPsec tunnel between the one or more virtual network functions of the wireless base station and a wireless network services operator network; at least one S1/X2 IPsec tunnel between the one or more virtual network functions of the wireless base station and a wireless network services operator network; at least one O1 IPsec tunnel to an Operations and Maintenance (OAM) secure gateway for a wireless base station Device Management System (DMS).

Example 2 includes the method of Example 1, wherein the node of the scalable cloud environment is a controller node of the edge cloud and the one or more virtualized entities comprise one or both of a central unit control-plane (CU-CP) VNF and a central unit user-plane (CU-UP) VNF.

Example 3 includes the method of Example 2, wherein the controller node generates an authorization token signed with PKI signing certificate and private key for one or more compute nodes of the edge cloud, wherein the one or more compute nodes utilize the authorization token to obtain certificates and keys from the global certificate authority (CA).

Example 4 includes the method of any of Examples 1-3, wherein the node of the scalable cloud environment is a compute node of the edge cloud and the one or more virtualized entities comprise at least one distribution node (DU) VNF, the wireless base station further comprising one or more radio units (RU) coupled to the at least one DU VNF, the one or more radio units (RU) configured to implement a radio frequency (RF) interface and are deployed in a physical location where radio coverage is to be provided.

Example 5 includes the method of any of Examples 1-4, wherein obtaining the node certificate and private key further comprises: executing a PKI client application for acquiring the node certificate and private key from the global CA; sending to the global CA the digital certificate and private key request for acquiring the node certificate and private key, wherein the digital certificate and private key used to sign the digital certificate and private key request is embedded and obfuscated within the PKI client application; receiving from the global CA a digital certificate and private key response comprising a node level certificate and private key; decrypting the node level private key and storing the node level private key with the node level certificate.

Example 6 includes the method of any of Examples 1-5, further comprising: obtaining an edge cloud node cluster sub CA certificate and private key from either an edge cloud node cluster or from the global CA, using a PKI request signed using the PKI signing certificate and private key.

Example 7 includes the method of Example 6, wherein obtaining the edge cloud node cluster sub CA certificate and private key comprises: sending the PKI request to acquire the edge cloud node cluster sub CA certificate and private key from the global CA; receiving from the global CA an edge cloud node sub CA certificate and private key response comprising an edge cloud node sub CA certificate and private key; and decrypting the edge cloud node sub CA private key and installing the edge cloud node sub CA certificate and private key.

Example 8 includes the method of any of Examples 1-7, wherein establishing an orchestration access IPsec tunnel to an orchestration central cloud comprises establishing an orchestration access IPsec tunnel though an orchestration and management network to couple cloud worker nodes hosting virtualized entities in an edge cloud of the scalable cloud environment to a cloud master node that implements the orchestration central cloud.

Example 9 includes the method of any of Examples 1-8, wherein obtaining the at least one VNF certificate and private key comprises: sending the PKI request to acquire the at least one VNF certificate and private key from a first VNF of the one or more virtualized entities to the global CA; receiving from the global CA a VNF certificate and private key response comprising a VNF certificate and private key; and decrypting the VNF private key and storing the VNF certificate and private key.

Example 10 includes the method of any of Examples 1-9, further comprising: establishing at least one operator CA tunnel between the one or more deployed VNFs and a network operator CA secure gateway and acquire one or more sets of X2 IPsec certificate and private key from an operator CA via the at least one operator CA tunnel.

Example 11 includes the method of any of Examples 1-10, where the node comprises a VNF hosting platform for one or more virtualized entities of a wireless communications base station, the VNF hosting platform comprising a processor coupled to a memory.

Example 12 includes a Virtual Network Function (VNF) hosting platform for one or more virtualized entities of a wireless communications base station, the VNF hosting platform comprising: a processor coupled to a memory, wherein the processor is configured to execute code to install and orchestrate a node of a virtualized wireless base station by: obtaining a node certificate and private key from a global certificate authority (CA), wherein the node certificate and private key defines a PKI signing certificate and private key; establishing an orchestration access IPsec tunnel to an orchestration central cloud comprising one or more functions for edge cloud orchestration; utilizing, via the orchestration access IPsec tunnel, the one or more functions for edge cloud orchestration to deploy on the node one or more virtualized entities comprising one or more virtual network functions of a wireless base station; obtaining at least one VNF certificate and private key for the one or more virtual network functions from the global CA; utilizing the at least one VNF certificate and private key, establishing one or more IPsec tunnels comprising at least one of: at least one X2 IPsec tunnel between the one or more virtual network functions of the wireless base station and a wireless network services operator network; at least one S1/X2 IPsec tunnel between the one or more virtual network functions of the wireless base station and a wireless network services operator network; at least one O1 IPsec tunnel to an Operations and Maintenance (OAM) secure gateway for a wireless base station Device Management System (DMS).

Example 13 includes the VNF platform of Example 12, wherein the one or more virtualized entities comprise one or both of a central unit control-plane (CU-CP) VNF and a central unit user-plane (CU-UP) VNF.

Example 14 includes the VNF platform of any of Examples 12-13, wherein the VNF hosting platform comprises a controller node configured to generate an authorization token signed with the PKI signing certificate and private key for one or more compute nodes of the edge cloud, wherein the one or more compute nodes utilize the authorization token to obtain certificates and keys from the global CA.

Example 15 includes the VNF platform of any of Examples 12-14, wherein the one or more virtualized entities comprise at least one distribution node (DU) VNF.

Example 16 includes the VNF platform of any of Examples 12-15, wherein obtaining the node certificate and private key comprises: executing a PKI client application for acquiring the node certificate and private key from the global CA; sending to the global CA a digital certificate and private key request for acquiring the node certificate and private key, wherein the digital certificate and private key request is embedded and obfuscated within the PKI client application; receiving from the global CA a digital certificate and private key response comprising a node level certificate and private key; decrypting the node level private key and storing the node level certificate and private key.

Example 17 includes the VNF platform of any of Examples 12-16, further comprising: obtaining an edge cloud node cluster sub CA certificate and private key, wherein obtaining the edge cloud node cluster sub CA certificate and private key comprises: sending a PKI request to acquire the edge cloud node cluster sub CA certificate and private key from the global CA; receiving from the global CA an edge cloud node sub CA certificate and private key response comprising an edge cloud node sub CA certificate and private key; and decrypting the edge cloud node sub CA private key and installing the edge cloud node sub CA certificate and private key.

Example 18 includes the VNF platform of any of Examples 12-17, wherein establishing an orchestration access IPsec tunnel to an orchestration central cloud comprises establishing an orchestration access IPsec tunnel though an orchestration and management network to couple to a cloud master node that implements the orchestration central cloud.

Example 19 includes the VNF platform of any of Examples 12-18, wherein obtaining the at least one VNF certificate and private key comprises: sending a PKI request to the global CA to acquire the at least one VNF certificate and private key from a first VNF of the one or more virtualized entities; receiving from the global CA a VNF certificate and private key response comprising a VNF certificate and private key; and decrypting the VNF private key and storing the VNF certificate and private key.

Example 20 includes the VNF platform of any of Examples 12-19, wherein the processor is configured to execute code to install and orchestrate a node of a virtualized wireless base station by further: establishing at least one operator CA tunnel between the one or more VNFs and a network operator CA secure gateway and acquiring one or more sets of X2 IPsec certificate and private key from an operator CA via the at least one operator CA tunnel.

In various alternative embodiments, system and/or device elements, method steps, or example implementations described throughout this disclosure (such as any of the Central Cloud, Edge Cloud, Orchestration Central Cloud, Certificate Authorities, Cloud Master Node, Cloud Worker Node, virtual network function, central unit control-plane (CU-CP) VNF, central unit user-plane (CU-CP) VNF, and distributed unit (DU) VNF, radio units, VNF hosting platform, gateways, compute node, controller node, processor, memory, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, cloud-based virtualized wireless base station related terms such as Central Cloud, Edge Cloud, Orchestration Central Cloud, Certificate Authorities, Cloud Master Node, Cloud Worker Node, virtual network function, central unit control-plane (CU-CP) VNF, central unit user-plane (CU-CP) VNF, and distributed unit (DU) VNF, radio units, VNF hosting platform, gateways, compute node, controller node, processor, memory, or sub-parts thereof, refer to non-generic elements as would recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for secure virtualized wireless base station orchestration on a node of a scalable cloud environment, the method comprising:
   obtaining a node certificate and a node private key from a global certificate authority (CA) using a first Public Key Infrastructure (PKI) request signed using a global certificate and a global private key, wherein the node certificate and the node private key defines a PKI signing certificate and a PKI signing private key;
   establishing an orchestration access IPsec tunnel to an orchestration central cloud comprising one or more functions for edge cloud orchestration;
   utilizing, via the orchestration access IPsec tunnel, the one or more functions for edge cloud orchestration to deploy on the node one or more virtualized entities comprising one or more virtual network functions of a wireless base station;
   obtaining at least one virtual network function (VNF) certificate and at least one VNF private key for the deployed one or more virtualized entities from the global CA using at least one second PKI request signed using the global certificate and the global private key;

utilizing the at least one VNF certificate and the at least one VNF private key, establishing one or more IPsec tunnels comprising at least one of:
- at least one X2 IPsec tunnel between the one or more virtual network functions of the wireless base station and a wireless network services operator network;
- at least one S1/X2 IPsec tunnel between the one or more virtual network functions of the wireless base station and the wireless network services operator network;
- at least one O1 IPsec tunnel to an Operations and Maintenance (OAM) secure gateway for a wireless base station Device Management System (DMS).

2. The method of claim 1, wherein the node of the scalable cloud environment is a controller node of the edge cloud and the one or more virtualized entities comprise one or both of a central unit control-plane (CU-CP) VNF and a central unit user-plane (CU-UP) VNF.

3. The method of claim 2, wherein the controller node generates an authorization token signed with the PKI signing certificate and the PKI signing private key for one or more compute nodes of the edge cloud, wherein the one or more compute nodes utilize the authorization token to obtain certificates and keys from the global certificate authority (CA).

4. The method of claim 1, wherein the node of the scalable cloud environment is a compute node of the edge cloud and the one or more virtualized entities comprise at least one distribution node (DU) VNF,
the wireless base station further comprising one or more radio units (RU) coupled to the at least one DU VNF, the one or more radio units (RU) configured to implement a radio frequency (RF) interface and are deployed in a physical location where radio coverage is to be provided.

5. The method of claim 1, wherein obtaining the node certificate and the node private key further comprises:
executing a PKI client application for acquiring the node certificate and the node private key from the global CA;
sending to the global CA a digital certificate and private key request for acquiring the node certificate and the node private key, wherein a digital certificate and private key used to sign the digital certificate and private key request is embedded and obfuscated within the PKI client application;
receiving from the global CA a digital certificate and private key response comprising the node certificate and the node private key, wherein the node private key received from the global CA is encrypted;
decrypting the encrypted node private key and storing the node private key with the node certificate.

6. The method of claim 1, further comprising:
obtaining an edge cloud node cluster sub CA certificate and an edge cloud node cluster sub CA private key from either an edge cloud node cluster or from the global CA, using a third PKI request signed using the PKI signing certificate and the PKI signing private key.

7. The method of claim 6, wherein obtaining the edge cloud node cluster sub CA certificate and the edge cloud node cluster sub CA private key comprises:
sending the third PKI request to acquire the edge cloud node cluster sub CA certificate and the edge cloud node cluster sub CA private key from the global CA;
receiving from the global CA an edge cloud node cluster sub CA certificate and private key response comprising the edge cloud node cluster sub CA certificate and the edge cloud node cluster sub CA private key, wherein the edge cloud node cluster sub CA private key received from the global CA is encrypted; and
decrypting the encrypted edge cloud node cluster sub CA private key and installing the edge cloud node cluster sub CA certificate and the edge cloud node cluster sub CA private key.

8. The method of claim 1, wherein establishing the orchestration access IPsec tunnel to the orchestration central cloud comprises establishing the orchestration access IPsec tunnel though an orchestration and management network to couple cloud worker nodes hosting the one or more virtualized entities in the edge cloud of the scalable cloud environment to a cloud master node that implements the orchestration central cloud.

9. The method of claim 1, wherein obtaining the at least one VNF certificate and the at least one VNF private key comprises:
sending the at least one second PKI request to acquire the at least one VNF certificate and the at least one VNF private key from a first VNF of the one or more virtualized entities to the global CA;
receiving from the global CA a VNF certificate and private key response comprising a first VNF certificate and a first VNF private key, wherein the first VNF private key received from the global CA is encrypted; and
decrypting the encrypted first VNF private key and storing the first VNF certificate and the first VNF private key.

10. The method of claim 1, further comprising:
establishing at least one operator CA tunnel between the deployed one or more virtualized entities and a network operator CA secure gateway and acquire one or more sets of X2 IPsec certificate and X2 IPsec private key from an operator CA via the at least one operator CA tunnel.

11. The method of claim 1, where the node comprises a VNF hosting platform for the one or more virtualized entities of the wireless base station, the VNF hosting platform comprising a processor coupled to a memory.

12. A Virtual Network Function (VNF) hosting platform for one or more virtualized entities of a wireless base station, the VNF hosting platform comprising:
a processor coupled to a memory, wherein the processor is configured to execute code to install and orchestrate a node of a virtualized wireless base station by:
obtaining a node certificate and a node private key from a global certificate authority (CA), wherein the node certificate and the node private key defines a Public Key Infrastructure (PKI) signing certificate and a PKI signing private key;
establishing an orchestration access IPsec tunnel to an orchestration central cloud comprising one or more functions for edge cloud orchestration;
utilizing, via the orchestration access IPsec tunnel, the one or more functions for edge cloud orchestration to deploy on the node the one or more virtualized entities comprising one or more virtual network functions of the wireless base station;
obtaining at least one VNF certificate and at least one VNF private key for the one or more virtual network functions from the global CA;
utilizing the at least one VNF certificate and the at least one VNF private key, establishing one or more IPsec tunnels comprising at least one of:

at least one X2 IPsec tunnel between the one or more virtual network functions of the wireless base station and a wireless network services operator network;

at least one S1/X2 IPsec tunnel between the one or more virtual network functions of the wireless base station and the wireless network services operator network;

at least one O1 IPsec tunnel to an Operations and Maintenance (OAM) secure gateway for a wireless base station Device Management System (DMS).

13. The VNF hosting platform of claim 12, wherein the one or more virtualized entities comprise one or both of a central unit control-plane (CU-CP) VNF and a central unit user-plane (CU-UP) VNF.

14. The VNF hosting platform of claim 12, wherein the VNF hosting platform comprises a controller node configured to generate an authorization token signed with the PM signing certificate and the PKI signing private key for one or more compute nodes of the edge cloud, wherein the one or more compute nodes utilize the authorization token to obtain certificates and keys from the global CA.

15. The VNF hosting platform of claim 12, wherein the one or more virtualized entities comprise at least one distribution node (DU) VNF.

16. The VNF hosting platform of claim 12, wherein obtaining the node certificate and the node private key comprises:

executing a PKI client application for acquiring the node certificate and the node private key from the global CA;

sending to the global CA, a digital certificate and private key request for acquiring the node certificate and the node private key, wherein the digital certificate and private key request is embedded and obfuscated within the PKI client application;

receiving from the global CA, a digital certificate and private key response comprising the node certificate and the node private key, wherein the received node private key received from the global CA is encrypted;

decrypting the encrypted node private key and storing the node certificate and the node private key.

17. The VNF hosting platform of claim 12, further comprising:

obtaining an edge cloud node cluster sub CA certificate and an edge cloud node cluster sub CA private key, wherein obtaining the edge cloud node cluster sub CA certificate and the edge cloud node cluster sub CA private key comprises:

sending a PKI request to acquire the edge cloud node cluster sub CA certificate and the edge cloud node cluster sub CA private key from the global CA;

receiving from the global CA an edge cloud node cluster sub CA certificate and private key response comprising the edge cloud node cluster sub CA certificate and the edge cloud node cluster sub CA private key, wherein the edge cloud node cluster sub CA private key received from the global CA is encrypted; and decrypting the encrypted edge cloud node cluster sub CA private key and installing the edge cloud node sub CA certificate and the edge cloud node cluster sub CA private key.

18. The VNF hosting platform of claim 12, wherein establishing the orchestration access IPsec tunnel to the orchestration central cloud comprises establishing the orchestration access IPsec tunnel though an orchestration and management network to couple to a cloud master node that implements the orchestration central cloud.

19. The VNF hosting platform of claim 12, wherein obtaining the at least one VNF certificate and the at least one private key comprises:

sending a PKI request to the global CA to acquire the at least one VNF certificate and the at least one VNF private key from a first VNF of the one or more virtualized entities;

receiving from the global CA a VNF certificate and private key response comprising a first VNF certificate and a first VNF private key, wherein the first VNF private key received from the global CA is encrypted; and decrypting the encrypted first VNF private key and storing the first VNF certificate and the first VNF private key.

20. The VNF hosting platform of claim 12, wherein the processor is configured to execute code to install and orchestrate a node of a virtualized wireless base station by further:

establishing at least one operator CA tunnel between the one or more virtualized entities and a network operator CA secure gateway and acquiring one or more sets of X2 IPsec certificate and X2 IPsec private key from an operator CA via the at least one operator CA tunnel.

* * * * *

UNITED STATES PATENT AND TRADEMARK OFFICE
CERTIFICATE OF CORRECTION

PATENT NO. : 12,010,510 B2
APPLICATION NO. : 17/856164
DATED : June 11, 2024
INVENTOR(S) : Ni et al.

Page 1 of 1

It is certified that error appears in the above-identified patent and that said Letters Patent is hereby corrected as shown below:

In the Claims

At Column 31, Lines 17-18, please replace "the PM signing" with --the PKI signing--.

Signed and Sealed this
Twenty-third Day of July, 2024

Katherine Kelly Vidal
*Director of the United States Patent and Trademark Office*